United States Patent
Azancot et al.

(10) Patent No.: US 9,035,501 B2
(45) Date of Patent: *May 19, 2015

(54) SYSTEM AND METHOD FOR PROVIDING SIMPLE FEEDBACK SIGNALS INDICATING IF MORE OR LESS POWER IS REQUIRED DURING INDUCTIVE POWER TRANSMISSION

(71) Applicant: POWERMAT TECHNOLOGIES, LTD., Neve Ilan (IL)

(72) Inventors: Yossi Azancot, Jerusalem (IL); Amir Ben-Shalom, Modiin (IL); Arik Rofe, Jerusalem (IL); Oola Greenwald, Mevasseret Zion (IL); Alfred Leibovitz, Petach-Tikva (IL); Moti Ashery, Jerusalem (IL)

(73) Assignee: POWERMAT TECHNOLOGIES, LTD., Neve Ilan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,182

(22) Filed: May 20, 2014

(65) Prior Publication Data
US 2014/0252871 A1 Sep. 11, 2014

Related U.S. Application Data

(60) Division of application No. 12/883,457, filed on Sep. 16, 2010, which is a continuation of application No. PCT/IL2008/001641, filed on Dec. 18, 2008.

(60) Provisional application No. 61/064,618, filed on Mar.
(Continued)

(51) Int. Cl.
  *H02J 17/00* (2006.01)
  *H01F 38/14* (2006.01)
(Continued)

(52) U.S. Cl.
  CPC ............... *H02J 17/00* (2013.01); *H01F 27/266* (2013.01); *H01F 27/365* (2013.01); *H01F 38/14* (2013.01); *H01F 2038/143* (2013.01); *H02J 7/025* (2013.01)

(58) Field of Classification Search
  CPC .................................. H02J 17/00; H02J 7/025
  USPC .......................................... 307/104; 320/108
  See application file for complete search history.

(56) References Cited

U.S. PATENT DOCUMENTS 3,414,796 A   12/1968 Henquet
3,771,085 A   11/1973 Hojo et al.
(Continued)

FOREIGN PATENT DOCUMENTS

EP   0160990 A2   11/1985
EP   0160990 B1   1/1991
(Continued)

OTHER PUBLICATIONS

Liu et al. "An Analysis of Double-layer Electromagnetic Shield for a Universal Contactless Battery Charging Platform", IEEE 2005, p. 1767-1772.
(Continued)

*Primary Examiner* — Fritz M Fleming
(74) *Attorney, Agent, or Firm* — Brooks Kushman P.C.

(57) ABSTRACT

An inductive power outlet for providing power to an electric load via an inductive power receiver includes at least one primary inductive coil wired to a power supply via a driver configured to provide a driving voltage across the primary inductive coil such that a secondary voltage is induced in a secondary inductive coil associated with the inductive power receiver. The driver may include a controller configured to receive feedback control signals from the inductive power receiver indicating if more or less power is required. The controller may be further configured to adjust the driving voltage according to the control signals.

17 Claims, 19 Drawing Sheets

Related U.S. Application Data 17, 2008, provisional application No. 61/071,151, filed on Apr. 15, 2008, provisional application No. 61/129,526, filed on Jul. 2, 2008, provisional application No. 61/129,859, filed on Jul. 24, 2008, provisional application No. 61/129,970, filed on Aug. 4, 2008.

(51) Int. Cl.
*H02J 7/02* (2006.01)
*H01F 27/26* (2006.01)
*H01F 27/36* (2006.01)

(56) References Cited

U.S. PATENT DOCUMENTS

| | | | |
|---|---|---|---|
| 3,894,249 A * | 7/1975 | Minami et al. | 327/126 |
| 3,938,018 A | 2/1976 | Dahl | |
| 4,160,193 A | 7/1979 | Richmond | |
| 4,349,814 A | 9/1982 | Akehurst | |
| RE31,524 E | 2/1984 | Hoebel | |
| 4,431,948 A | 2/1984 | Elder et al. | |
| 4,580,062 A | 4/1986 | MacLaughlin | |
| 4,754,180 A | 6/1988 | Kiedrowski | |
| 4,977,515 A | 12/1990 | Rudden et al. | |
| 5,221,877 A | 6/1993 | Falk | |
| 5,278,771 A | 1/1994 | Nyenya | |
| 5,367,242 A | 11/1994 | Hulman | |
| 5,455,466 A | 10/1995 | Parks et al. | |
| 5,455,467 A * | 10/1995 | Young et al. | 307/104 |
| 5,486,394 A | 1/1996 | Stough | |
| 5,528,113 A | 6/1996 | Boys et al. | |
| 5,550,452 A | 8/1996 | Shirai et al. | |
| 5,600,225 A | 2/1997 | Goto | |
| 5,680,035 A | 10/1997 | Haim et al. | |
| 5,713,939 A | 2/1998 | Nedungadi et al. | |
| 5,734,254 A | 3/1998 | Stephens | |
| 5,762,250 A | 6/1998 | Carlton et al. | |
| 5,821,728 A | 10/1998 | Schwind | |
| 5,821,731 A | 10/1998 | Kuki et al. | |
| 5,907,285 A | 5/1999 | Toms et al. | |
| 5,929,598 A | 7/1999 | Nakama et al. | |
| 5,949,214 A | 9/1999 | Broussard et al. | |
| 6,042,005 A | 3/2000 | Basile et al. | |
| 6,127,799 A | 10/2000 | Krishnan | |
| 6,211,649 B1 | 4/2001 | Matsuda | |
| 6,230,029 B1 | 5/2001 | Hahn et al. | |
| 6,396,935 B1 | 5/2002 | Makkonen | |
| 6,436,299 B1 | 8/2002 | Baarman et al. | |
| 6,441,589 B1 | 8/2002 | Frerking et al. | |
| 6,484,260 B1 | 11/2002 | Scott et al. | |
| 6,532,298 B1 | 3/2003 | Cambier et al. | |
| 6,586,909 B1 | 7/2003 | Trepka | |
| 6,624,616 B1 | 9/2003 | Frerking et al. | |
| 6,644,557 B1 | 11/2003 | Jacobs | |
| 6,673,250 B2 | 1/2004 | Kuennen et al. | |
| 6,721,540 B1 | 4/2004 | Hayakawa | |
| 6,731,071 B2 | 5/2004 | Baarman | |
| 6,766,040 B1 | 7/2004 | Catalano et al. | |
| 6,803,744 B1 | 10/2004 | Sabo | |
| 6,825,620 B2 | 11/2004 | Kuennen et al. | |
| 6,888,438 B2 | 5/2005 | Hui et al. | |
| 6,894,457 B2 | 5/2005 | Germagian et al. | |
| D519,275 S | 4/2006 | Shertzer | |
| 7,043,060 B2 | 5/2006 | Quintana | |
| 7,126,450 B2 | 10/2006 | Baarman et al. | |
| 7,132,918 B2 | 11/2006 | Baarman et al. | |
| 7,164,255 B2 | 1/2007 | Hui | |
| 7,180,248 B2 | 2/2007 | Kuennen et al. | |
| 7,180,265 B2 | 2/2007 | Naskali et al. | |
| 7,224,086 B2 | 5/2007 | Germagian et al. | |
| 7,233,319 B2 | 6/2007 | Johnson et al. | |
| D553,852 S | 10/2007 | Brandenburg | |
| 7,278,310 B1 | 10/2007 | Rice | |
| 7,385,357 B2 | 6/2008 | Kuennen et al. | |
| 7,392,068 B2 | 6/2008 | Dayan et al. | |
| 7,405,535 B2 | 7/2008 | Frerking et al. | |
| 7,462,951 B1 | 12/2008 | Baarman | |
| D586,809 S | 2/2009 | Jones et al. | |
| 7,518,267 B2 | 4/2009 | Baarman | |
| 7,522,878 B2 | 4/2009 | Baarman | |
| 7,576,514 B2 | 8/2009 | Hui | |
| D599,735 S | 9/2009 | Amidei et al. | |
| D599,736 S | 9/2009 | Ferber et al. | |
| D599,737 S | 9/2009 | Amidei et al. | |
| D599,738 S | 9/2009 | Amidei et al. | |
| D603,603 S | 11/2009 | Laine et al. | |
| 7,612,528 B2 | 11/2009 | Baarman et al. | |
| D607,879 S | 1/2010 | Ferber et al. | |
| D611,407 S | 3/2010 | Webb | |
| D611,408 S | 3/2010 | Ferber et al. | |
| 8,049,370 B2 * | 11/2011 | Azancot et al. | 307/104 |
| 2002/0057584 A1 | 5/2002 | Brockmann | |
| 2002/0158512 A1 | 10/2002 | Mizutani et al. | |
| 2003/0210106 A1 | 11/2003 | Cheng et al. | |
| 2004/0023633 A1 | 2/2004 | Gordon | |
| 2004/0195767 A1 | 10/2004 | Randall | |
| 2004/0203537 A1 | 10/2004 | Yoshida et al. | |
| 2004/0242264 A1 | 12/2004 | Cho | |
| 2004/0261802 A1 | 12/2004 | Griffin et al. | |
| 2005/0007067 A1 | 1/2005 | Baarman et al. | |
| 2005/0083020 A1 | 4/2005 | Baarman | |
| 2005/0130593 A1 | 6/2005 | Michalak | |
| 2005/0164636 A1 | 7/2005 | Palermo et al. | |
| 2005/0169506 A1 | 8/2005 | Fenrich et al. | |
| 2005/0189910 A1 | 9/2005 | Hui | |
| 2005/0192062 A1 | 9/2005 | Michkle et al. | |
| 2005/0233768 A1 | 10/2005 | Guo et al. | |
| 2006/0028176 A1 | 2/2006 | Tang et al. | |
| 2006/0043927 A1 | 3/2006 | Beart et al. | |
| 2006/0052144 A1 | 3/2006 | Seil et al. | |
| 2006/0061325 A1 | 3/2006 | Tang et al. | |
| 2006/0071632 A1 | 4/2006 | Ghabra et al. | |
| 2006/0091222 A1 | 5/2006 | Leung et al. | |
| 2006/0093132 A1 | 5/2006 | Desormiere et al. | |
| 2006/0202665 A1 | 9/2006 | Hsu | |
| 2007/0023559 A1 | 2/2007 | Scapillato et al. | |
| 2007/0057763 A1 | 3/2007 | Blattner et al. | |
| 2007/0076459 A1 | 4/2007 | Limpkin | |
| 2007/0103110 A1 | 5/2007 | Sagoo | |
| 2007/0136593 A1 | 6/2007 | Plavcan et al. | |
| 2007/0165371 A1 | 7/2007 | Brandenburg | |
| 2007/0182367 A1 | 8/2007 | Partovi | |
| 2007/0210889 A1 | 9/2007 | Baarman et al. | |
| 2007/0279002 A1 | 12/2007 | Partovi | |
| 2008/0001922 A1 | 1/2008 | Johnson et al. | |
| 2008/0030985 A1 | 2/2008 | Joen et al. | |
| 2008/0049988 A1 | 2/2008 | Basile et al. | |
| 2008/0055047 A1 | 3/2008 | Osada et al. | |
| 2008/0079388 A1 | 4/2008 | Sarnowsky et al. | |
| 2008/0132293 A1 | 6/2008 | Gundlach et al. | |
| 2008/0157715 A1 | 7/2008 | Rosenboom et al. | |
| 2008/0223926 A1 | 9/2008 | Miller et al. | |
| 2008/0258680 A1 | 10/2008 | Frerking et al. | |
| 2008/0265835 A1 | 10/2008 | Reed et al. | |
| 2009/0026959 A1 | 1/2009 | Lin et al. | |
| 2009/0040807 A1 | 2/2009 | Doumae et al. | |
| 2009/0047768 A1 | 2/2009 | Jain | |
| 2009/0047769 A1 | 2/2009 | Bhat et al. | |
| 2009/0075704 A1 | 3/2009 | Wang | |
| 2009/0079387 A1 | 3/2009 | Jin et al. | |
| 2009/0084705 A1 | 4/2009 | Justiss | |
| 2009/0097221 A1 | 4/2009 | Sayed et al. | |
| 2009/0102416 A1 | 4/2009 | Burley | |
| 2009/0134972 A1 | 5/2009 | Wu, Jr. et al. | |
| 2009/0146608 A1 | 6/2009 | Lee | |
| 2009/0153098 A1 | 6/2009 | Toya et al. | |
| 2009/0153297 A1 | 6/2009 | Gardner | |
| 2009/0174263 A1 | 7/2009 | Baarman et al. | |
| 2009/0203355 A1 | 8/2009 | Clark | |

(56) References Cited

U.S. PATENT DOCUMENTS

| | | |
|---|---|---|
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |

FOREIGN PATENT DOCUMENTS

| | | |
|---|---|---|
| EP | 0558316 A1 | 9/1993 |
| EP | 1990734 A1 | 11/2008 |
| GB | 2399466 A | 9/2004 |
| GB | 2399466 B | 11/2005 |
| GB | 2429372 A | 2/2007 |
| JP | 04-156242 | 5/1992 |
| JP | 07-039078 | 2/1995 |
| JP | 07-036556 | 7/1995 |
| JP | 2001-309579 | 11/2001 |
| JP | 2001309579 | 11/2001 |
| JP | 2005-006440 | 1/2005 |
| JP | 2005-110412 | 4/2005 |
| JP | 2006-102055 | 4/2006 |
| JP | 2007-529110 | 10/2007 |
| WO | 9602879 A1 | 2/1996 |
| WO | 0201557 A1 | 1/2002 |
| WO | 0215320 A1 | 2/2002 |
| WO | 2005041281 A1 | 5/2005 |
| WO | 2005043775 A1 | 5/2005 |
| WO | WO 2005109598 A1 * | 11/2005 |
| WO | 2006015143 A2 | 2/2006 |
| WO | WO 2006031133 A1 * | 3/2006 |
| WO | 2006037972 A1 | 4/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915 Completed by the European Patent Office on Mar. 15, 2010, 3 Pages.

Search report and Written Opinion for PCT/IL2008/001282, Both completed by the US Patent Office on Feb. 25, 2009, 9 pages all together.

Search Report and Written Opinion for PCT/IL2008/001347, Both completed by the US Patent Office on Feb. 2, 2009, 10 Pages all together.

Search Report and Written Opinion for PCT/IL2008/001348, Both completed by the US Patent Office on Jan. 28, 2009, 9 Pages all together.

International Search Report for PCT/IL2008/01641, Completed by the US Patents and Trademark Office on May 21, 2009, 3 Pages.

Office Action dated Mar. 22, 2013, for Mexican Application MX/a/2011/003088.

Office Action dated Feb. 5, 2013, for Chinese Application 201110068458.7.

Office Action dated May 28, 2013, for Japanese Application 2010-526422.

Office Action dated May 28, 2013, for Japanese Application 2010-528526.

Office Action dated May 21, 2013, for Japanese Application 2011-500345.

* cited by examiner

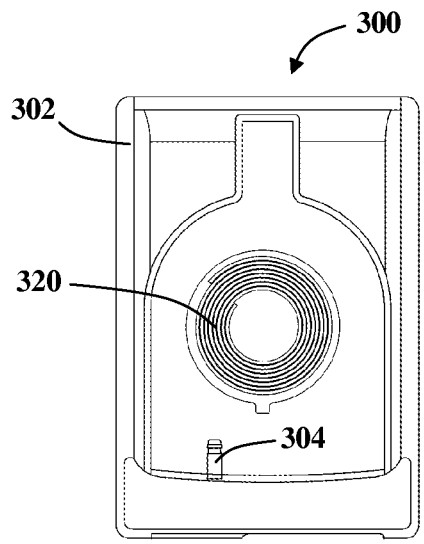
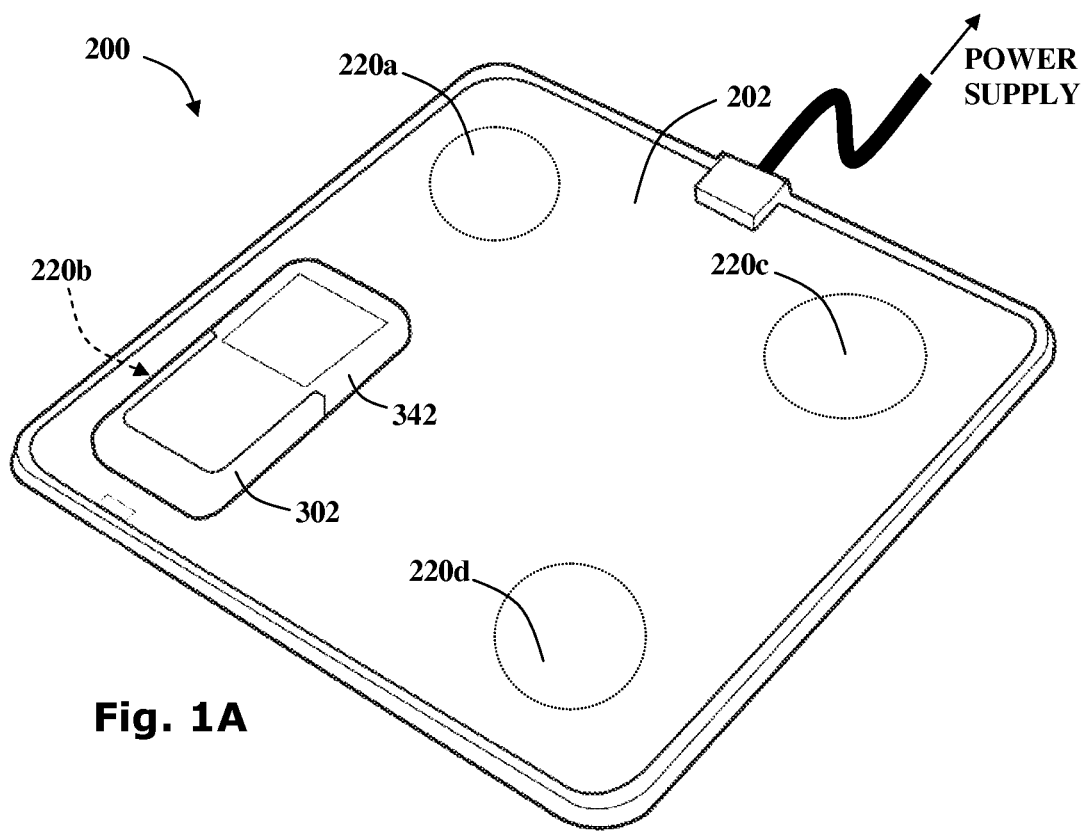
Fig. 1B
Fig. 1A

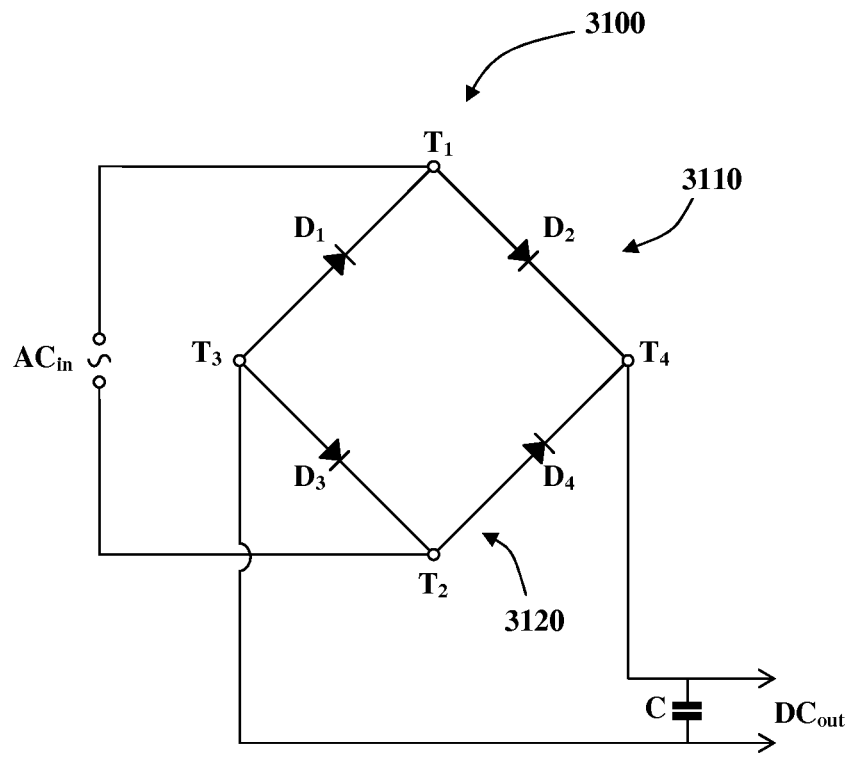
Fig. 3A    (PRIOR ART)
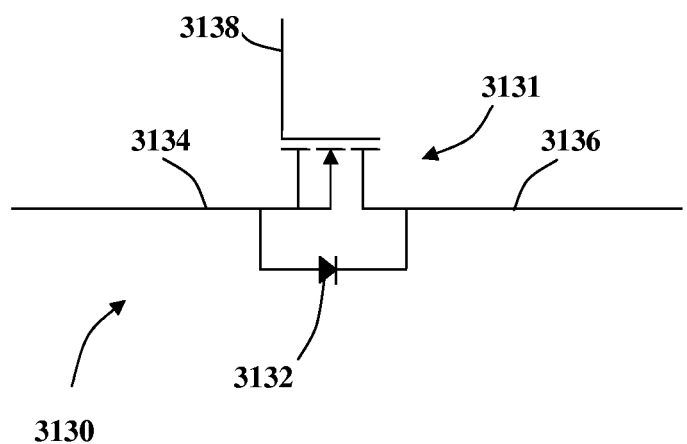
Fig. 3B    (PRIOR ART)

SYSTEM AND METHOD FOR PROVIDING SIMPLE FEEDBACK SIGNALS INDICATING IF MORE OR LESS POWER IS REQUIRED DURING INDUCTIVE POWER TRANSMISSION

CROSS-REFERENCE TO RELATED APPLICATIONS

This application is a division of U.S. application Ser. No. 12/883,457 filed Sep. 16, 2010, which is a continuation of PCT application Serial No. PCT/IL2008/001641 filed Dec. 18, 2008, which claims the benefit of U.S. provisional application Ser. No. 61/064,618 filed Mar. 17, 2008; 61/071,151 filed Apr. 15, 2008; 61/129,526 filed Jul. 2, 2008; 61/129,859 filed Jul. 24, 2008; and 61/129,970 filed Aug. 4, 2008, which are hereby incorporated by reference in their entirety.

TECHNICAL FIELD

The present invention is directed to inductive electrical power transfer. More specifically, the present invention relates to providing a transmission guard for preventing an inductive power outlet from transmitting power in the absence of an inductive power receiver.

BACKGROUND

Inductive power coupling, as known in the art, allows energy to be transferred from a power supply to an electric load without connecting wires. A power supply is wired to a primary coil and an oscillating electric potential is applied across the primary coil, thereby inducing an oscillating magnetic field. The oscillating magnetic field may induce an oscillating electrical current in a secondary coil placed close to the primary coil. In this way, electrical energy may be transmitted from the primary coil to the secondary coil by electromagnetic induction without the two coils being conductively connected. When electrical energy is transferred from a primary coil to a secondary coil the coil pair are said to be inductively coupled. An electric load wired in series with such a secondary coil may draw energy from the power source wired to the primary coil when the secondary coil is inductively coupled thereto.

Induction type power outlets may be preferred to the more common conductive power sockets because they provide seamless power transmission and minimize the need for trailing wires.

Low power inductive electrical power transmission systems have been proposed. One such example is described in U.S. Pat. No. 7,164,255 to Hui. In Hui's system a planar inductive battery charging arrangement enables electronic devices to be charged. The system includes a planar charging module having a charging surface on which a device to be charged is placed. Within the charging module, and parallel to the charging surface, at least one, and preferably an array of primary windings are provided. The primary windings inductively couple with secondary windings within the device to be charged.

Such systems provide inductive coupling at relatively low power adequate for charging batteries. It will be appreciated however, that base units such as Hui's charging surface which transmit energy continuously, in a largely uniform manner over an extended area, are not suitable for use with high energy systems, such as those required to power computers, light bulbs, televisions and the like.

Energy losses associated with high power inductive transfer systems are typically larger than those in low power systems such as Hui's charging surface. In addition whereas in low power systems excess heat may be readily dissipated, an uncoupled high power primary coil or its surroundings may become dangerously hot.

Moreover, the oscillating voltage in a high power primary coil produces an oscillating magnetic field. Where a secondary coil is inductively coupled to the primary coil, the resulting flux linkage causes power to be drawn by the secondary coil. Where there is no secondary coil to draw the power, the oscillating magnetic field causes high energy electromagnetic waves to be radiated in all directions which may have undesired side effects, such as erasing data from credit cards and may be harmful to bystanders particularly to those with pacemakers.

U.S. Pat. No. 6,803,744, to Sabo, titled "Alignment independent and self-aligning inductive power transfer system" describes an inductive power transfer device for recharging cordless appliances. Sabo's device includes a plurality of inductors which serve as the primary coil of a transformer. The secondary coil of the transformer is arranged within the appliance. When the appliance is positioned proximate to the power transfer device with the respective coils in alignment, power is inductively transferred from the device to the appliance via the transformer.

The inductors of Sabo's system are arranged in an array and connected to a power supply via switches which are selectively operable to activate the respective inductors. These selectively operable switches are provided to conserve power and to eliminate objectionable electromagnetic fields. '744 thus indicates the problem of electromagnetic leakage as well as the need for each primary coil to be energized from the power supply only when a secondary coil is within effective range. Furthermore the power receiving units described in '744 are bulky and impractical for use with small electrical devices.

The need remains therefore for a practical inductive power transfer system for safely and conveniently delivering power wirelessly from inductive power outlets to inductive power receivers in an energy efficient manner. The present invention addresses this need.

SUMMARY

It is an aim of the invention to provide a transmission system comprising at least one inductive power outlet for transferring power inductively to at least one inductive power receiver, at least one alignment mechanism for aligning the power receiver to the power outlet and at least one signal transfer system for passing control signals from the power receiver to the power outlet. Typically, the inductive power outlet comprises at least one primary inductive coil wired to a power source via a driver, the driver for providing an oscillating voltage across the primary inductive coil at high frequency, and a primary ferromagnetic core. The inductive power receiver comprises at least one secondary inductive coil for coupling with the primary inductive coil, the secondary inductive coil being wired to a power regulator. The signal transfer system comprises a signal emitter associated with the power receiver and a signal detector associated with the power outlet.

Optionally, the alignment mechanism comprises a first element associated with the power outlet and a second magnetic element associated with the power receiver. Typically, the signal emitter comprises an optical emitter and the signal detector comprises an optical detector. Optionally, again, the power regulator comprises a rectifier for converting an AC input from the inductive power outlet into a DC output for powering the electrical device. Another aim of the invention is to present an inductive power receiver for receiving power inductively from an inductive power outlet. Optionally, the system comprises a power converter selected from the group comprising: a transformer, a DC-to-DC converter, an AC-to-DC converter, an AC-to-AC converter, a flyback transformer, a flyback converter, a full-bridge converter, a half-bridge converter and a forward converter.

A further aim of the invention is to present an inductive power transfer system comprising at least one inductive power outlet for transferring power inductively to at least one inductive power receiver, the inductive power outlet comprising at least one primary inductor wired to a power source via a driver, and the inductive power receiver comprising at least one secondary inductor for coupling with the primary inductor, the secondary inductor for providing power to an electric load; the inductive power transfer system comprising a low heat-loss full wave rectifier comprising: a first half-wave rectifier having one anode wired to a first output terminal and one cathode wired to a first input terminal; a second half-wave rectifier having one anode wired to the first output terminal and one cathode wired to a second input terminal; a third half-wave rectifier having one anode wired to the first input terminal and one cathode wired to a second output terminal, and a fourth half-wave rectifier having one anode wired to the second input terminal and one cathode wired to the second output terminal; the full wave rectifier for providing an output of constant polarity from an input of variable polarity, wherein at least one half-wave rectifier comprises an electronic switch configured to be in its ON state when the current flowing through the cathode of the switch exceeds a predetermined threshold.

Optionally, the first half-wave rectifiers comprises a first electronic switch configured to be in its ON setting when the current flowing through its cathode exceeds a first predetermined threshold, and the second half-wave rectifiers comprises a second electronic switch configured to be in its ON setting when the current flowing through its cathode exceeds a second predetermined threshold. Preferably, at least one half-wave rectifier comprises an electronic switch configured to be switched between its ON and OFF states in synchrony with the frequency of the input signal.

Preferably, the first half-wave rectifier comprises a first electronic switch configured to be in its ON state when the current flowing through its cathode exceeds a predetermined threshold; the second half-wave rectifiers comprises a second electronic switch configured to be in its ON state when the current flowing through its cathode exceeds a predetermined threshold; the third half-wave rectifiers comprises a third electronic switch configured to be switched between its ON and OFF states in phase with the voltage signal at the second input terminal, and the fourth half-wave rectifiers comprises a third electronic switch configured to be switched between its ON and OFF states in phase with the voltage signal at the first input terminal.

Typically the electronic switch comprises a transistor, in particular, a MOSFET device. Preferably, the electronic switch comprises: a MOSFET device comprising a source terminal, a drain terminal and a gate terminal; a half-wave rectifier wired to the source terminal and the drain terminal in parallel with the MOSFET device, and a current monitor configured to monitor a drain-current flowing through the drain terminal and to send a gate signal to the gate terminal such that the MOSFET is switched to its ON state when the drain-current exceeds a first threshold current and the MOSFET is switched to its OFF state when the drain-current falls below a second threshold current. Optionally, the current monitor comprises a current transformer.

It is another aim of the invention to present an inductive power transfer system comprising at least one inductive power outlet comprising at least one primary inductive coil wired to a power supply via a driver; the primary inductive coil for forming an inductive couple with at least one secondary inductive coil wired to an electric load, the secondary inductive coil associated with an inductive power receiver wherein the driver is configured to provide a driving voltage across the primary inductive coil, the driving voltage oscillating at a transmission frequency significantly different from the resonant frequency of the inductive couple. Optionally, the driver comprises a switching unit for intermittently connecting the primary inductive coil to the power supply.

Preferably, the transmission frequency lies within a range in which induced voltage varies approximately linearly with frequency. Optionally, the driver is configured to adjust the transmission frequency in response to the feedback signals.

Optionally, the inductive power outlet comprising a signal detector adapted to detect a first signal and a second signal, and the driver is configured to: increase the transmission frequency when the first signal is detected by the detector, and decrease the transmission frequency when the second signal is detected by the detector. The feedback signals generally carry data pertaining to the operational parameters of the electric load. Operational parameters are selected from the group comprising: required operating voltage for the electric load; required operating current for the electric load; required operating temperature for the electric load; required operating power for the electric load; measured operating voltage for the electric load; measured operating current for the electric load; measured operating temperature for the electric load; measured operating power for the electric load; power delivered to the primary inductive coil; power received by the secondary inductive coil, and a user identification code. Optionally, the detector is selected from the list comprising optical detectors, radio receivers, audio detectors and voltage peak detectors.

Preferably, the driver further comprises a voltage monitor for monitoring the amplitude of a primary voltage across the primary coil. Optionally, the voltage monitor is configured to detect significant increases in primary voltage.

In preferred embodiments, the driving voltage oscillating at a transmission frequency higher than the resonant frequency of the inductive couple, wherein the primary inductive coil is further wired to a reception circuit comprising a voltage monitor for monitoring the amplitude of a primary voltage across the primary coil, and the secondary inductive coil is further wired to a transmission circuit for connecting at least one electric element to the secondary inductive coil thereby increasing the resonant frequency such that a control signal may be transferred from the transmission circuit to the reception circuit. Optionally, the secondary inductive coil is wired to two inputs of a bridge rectifier and the electric load is wired to two outputs of the bridge rectifier wherein the transmission circuit is wired to one input of the bridge rectifier and one output of the bridge rectifier. Typically, the transmission circuit further comprises a modulator for modulating a bit-rate signal with an input signal to create a modulated signal and a switch for intermittently connecting the electrical element to the secondary inductive coil according to the modulated signal. Optionally, the voltage monitor further comprises a correlator for cross-correlating the amplitude of the primary voltage with the bit-rate signal for producing an output signal.

In certain embodiments, the control signal is for transferring a feedback signal from the secondary inductive coil to the primary inductive coil for regulating power transfer across an inductive power coupling. The driver may be configured to adjust the transmission frequency in response to the feedback signals. Typically, the system is adapted to transfer a first signal and a second signal, and the driver is configured to: increase the transmission frequency when the first signal is received by the receiver, and decrease the transmission frequency when the second signal is received by the receiver.

It is still a further aim of the invention to present an inductive power adaptor comprising: at least one inductive power receiver for receiving power from an inductive power outlet; at least one power connector for conductively connecting the power receiver to at least one electrical device, and a grip for handling the adapter, the grip being thermally isolated from the power receiver such that when the power receiver is in operation a user may handle the adapter without injury. Optionally, the adapter further comprises a printed circuit board.

Typically, the power receiver is for providing power at a rate above 50 W. Preferably, the adapter comprises a cooling system for dissipating heat generated therein. Optionally, the cooling system comprises at least one air outlet, situated above the power receiver, and at least one air inlet, situated below the power receiver such that hot air heated by the power receiver flows out of the adapter through the air outlet and cool air from outside is drawn into the adapter through the air inlets.

Preferably, the adapter further comprises at least one heat sink for dissipating heat generated by the power receiver. Optionally, the heat sink is a metallic disk. Typically, the heat sink is smaller than the internal diameter of a casing of the adapter thereby allowing air to circulate between the heat sink and the casing.

It is a further aim of the invention to present a transmission-guard for preventing an inductive power outlet from transmitting power in the absence of an electric load inductively coupled thereto, the inductive power outlet comprising at least one primary coil connectable to a power supply, for inductively coupling with a secondary coil wired to the electric load, the transmission-guard comprising at least one transmission-lock for preventing the primary coil from connecting to the power supply in the absence of a transmission-key.

Optionally, the transmission-lock comprises at least one magnetic switch and the transmission-key comprises at least one magnetic element associated with the secondary coil. Typically, the transmission-lock comprises an array of magnetic switches configured to connect the primary coil to the power supply only when activated by a matching configuration of magnetic elements. Optionally, the magnetic switch comprises a magnetic sensor.

Alternatively, the transmission-guard comprises: at least one emitter for emitting a release-signal, and at least one detector for detecting the release signal; the transmission-key comprises at least one bridge associated with the secondary coil for bridging between the at least one emitter and the at least one detector, such that when the secondary coil is brought into alignment with the primary coil the release signal is guided from the emitter to the detector. Optionally, the release-signal is an optical signal and the bridge comprises at least one optical wave-guide. Alternatively, the release-signal is a magnetic signal and the bridge comprises a magnetic flux guide. In other embodiments the transmission-key comprises a release-signal emitted by an emitter associated with the secondary coil. The release-signal may be an optical signal and the optical signal may be an infra-red pulse received by an optical detector configured to release the transmission-lock. Alternatively the release-signal is a magnetic signal. In some embodiments of the transmission guard the emitter is the secondary coil.

Optionally, the transmission-guard comprises a low-power power pulse transmitted by the primary coil, such that when the secondary coil is aligned to the primary coil the power pulse is transferred to the secondary coil and the transmission-key is triggered by the power pulse. Preferably, a first transmission-lock is released by a first transmission-key indicating the probable presence of a secondary coil and a second transmission-lock is released by a second transmission-key confirming the presence of the secondary coil. The first transmission-lock may initiate a power pulse transmitted from the primary coil, and the second transmission key being triggered by the power pulse being received by the secondary coil. The magnetic element may comprise a ferrite flux guidance core. Variously, the release-signal is selected from the group comprising: mechanical signals, audio signals, ultra-sonic signals and microwaves. It is also an aim to present separately: a transmission-key for use in the transmission-guard, a transmission-lock for use in the transmission-guard of claim 40, and an inductive power outlet protected by the transmission-guard.

It is yet another aim of the invention to present an inductive power transfer system comprising at least one inductive power receiver for receiving power from an inductive power outlet, the inductive power outlet comprising at least one primary inductor wired to a power source via a driver, and the inductive power receiver comprising at least one secondary inductor for coupling with the primary inductor, the secondary inductor for providing power to an electric load; the inductive power transfer system comprising at least one magnetic flux guide for directing magnetic flux from the primary inductor to the secondary inductor wherein the magnetic flux guide comprises an amorphous ferromagnetic material. Optionally, the amorphous ferromagnetic material has a thickness of less than 30 microns. Typically, the amorphous ferromagnetic material is sandwiched between two polymer layers. Preferably, the magnetic flux guide comprises a plurality of layers of amorphous ferromagnetic material separated by electrically insulating material.

In some embodiments, the magnetic flux guide comprises a wafer of the amorphous ferromagnetic material. Preferably, the wafer is at least partially split so as to reduce the buildup of eddy currents. Optionally, the wafer is circular and having a split extending along at least one diameter. In certain embodiments, the wafer is cut from a sheet of the amorphous ferromagnetic material. Alternatively, the magnetic flux guide comprises microwires of the amorphous ferromagnetic material. Optionally, the microwires form a cloth.

It is a particular aim of the invention to present an inductive power transfer system comprising at least one inductive power outlet for transferring power inductively to at least one inductive power receiver, the inductive power outlet comprising at least one primary inductor wired to a power source via a driver, and the inductive power receiver comprising at least one secondary inductor for coupling with the primary inductor, the secondary inductor for providing power to an electric load; the inductive power transfer system comprising at least one of the optimization components selected from the group comprising: a low heat-loss full wave rectifier comprising at least one electronic switch configured to be in its ON state when the current flowing through the cathode of the switch exceeds a predetermined threshold; a driver connected between the power source and the primary inductor, the driver being is configured to provide a driving voltage across the primary inductive coil, the driving voltage oscillating at a transmission frequency significantly different from the resonant frequency of the inductive couple formed by the primary inductor and the secondary inductor; an inductive power adaptor comprising a grip for handling the power receiver, the grip being thermally isolated from the power receiver such that when the power receiver is in operation a user may handle the adapter without injury; a transmission-guard for preventing the inductive power outlet from transmitting power in the absence of an electric load inductively coupled thereto, the transmission-guard comprising at least one transmission-lock for preventing the primary coil from connecting to the power supply in the absence of a transmission-key, and a magnetic flux guide for directing magnetic flux from the primary inductor to the secondary inductor wherein the magnetic flux guide comprises an amorphous ferromagnetic material.

In further embodiments the inductive power transfer system comprises at least two of the optimization components listed above. Preferably, the inductive power transfer system comprises at least three of the optimization components.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIG. 1A is a schematic diagram representing an inductive power transfer system according to an exemplary embodiment of the present invention;

FIG. 1B is a schematic diagram representing an inductive power receiver for use in the inductive power transfer system of FIG. 1A;

FIG. 3A is a circuit diagram of a full-wave diode bridge rectifier of the prior art;

FIG. 3B is a diagram of a Power MOSFET of the prior art;

DETAILED DESCRIPTION

Figure 1C:
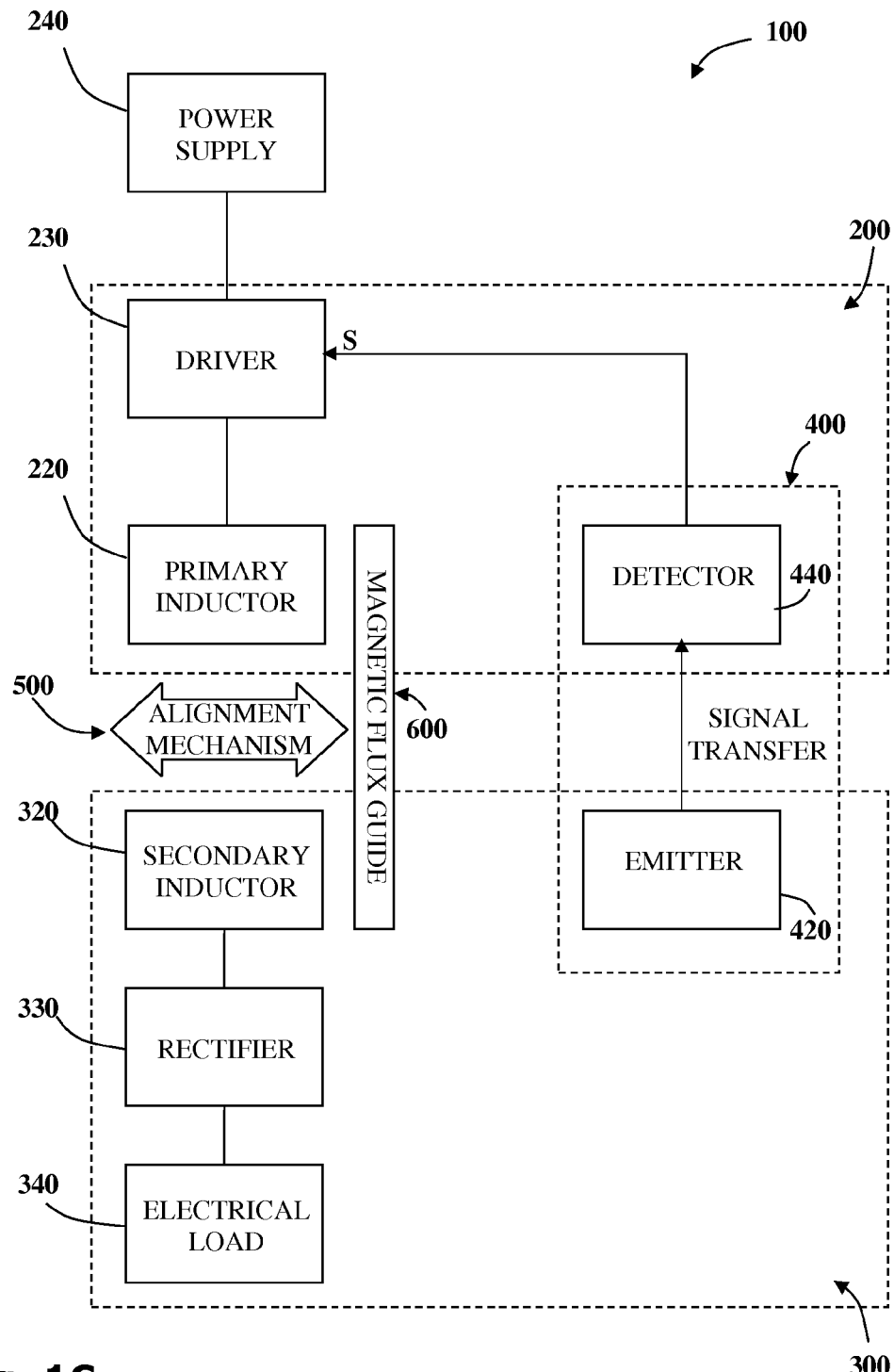
FIG. 1C is a block diagram representation of the main components of the inductive power transfer system according to the exemplary embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Reference is now made to FIGS. 1A and 1B showing an inductive power outlet 200 and an inductive power receiver 300 for use in an exemplary inductive power transfer system 100 according to an exemplary embodiment of the invention.

The inductive power outlet 200 consists of four primary inductors 220a-d incorporated within a platform 202. The inductive power receiver 300 includes a secondary inductor 320 incorporated within a case 302 for accommodating a mobile telephone 342. When a mobile telephone 342 is placed within the case 302 a power connector 304 electrically connects the secondary inductor 320 with the mobile telephone 342. As shown in FIG. 1A, the inductive power receiver 300 may be placed upon the platform 202 in alignment with one of the primary inductors 220b so that the secondary inductor 320 inductively couples with the primary inductor 220b.

Referring now to FIG. 1C, which shows a block diagram representing the main components of the inductive transfer system 100, various features are included to improve power transfer across the inductive couple.

The inductive power outlet 200 includes a primary inductor 220, wired to a power supply 240 via a driver 230. The driver 230 typically includes electronic components, such as a switching unit for example, for providing an oscillating electrical potential to the primary inductor 220. The oscillating electrical potential across the primary inductor 220 produces an oscillating magnetic field in its vicinity.

The inductive power receiver 300 includes a secondary inductor 320 wired to an electric load 340, typically via a rectifier 330. The secondary inductor 320 is configured such that, when placed in the oscillating magnetic field of an active primary inductor 220, a secondary voltage is induced across the secondary inductor 320. The secondary voltage may be used to power the electric load 340. It is noted that an induced secondary voltage across the secondary inductor 320 produces an alternating current (AC). Where the electric load 340 requires direct current (DC), such as for charging electrochemical cells, the rectifier 330 is provided to convert AC to DC.

In contradistinction to prior art inductive power transfer systems, which have proved impractical or commercially unviable, embodiments of the current invention include further elements for improving the efficiency of power transfer from the inductive power outlet 200 to the inductive power receiver 300. For example, preferred embodiments of the invention include a signal transfer system 400, an alignment mechanism 500 and a magnetic flux guide 600.

The signal transfer system 400 provides a channel for passing signals between the inductive power receiver 300 and the inductive power outlet 200. The signal transfer system 400 includes a signal emitter 420, associated with the inductive power receiver 300 and a signal detector 440, associated with the inductive power outlet 200. Signals may perform a variety of functions such as inter alia, confirming the presence of a power receiver 300, regulating power transfer or for communicating required power transmission parameters. The latter being particularly useful in systems adapted to work at multiple power levels. Various signal transfer systems may be used such as optical, inductive, ultrasonic signal emitters or the like in combination with appropriate detectors.

The alignment mechanism 500 is provided to facilitate the alignment of the secondary inductor 320 with the primary inductor 220 thereby improving the efficiency of the inductive transfer system 100. Where the user is able to see the primary inductor 220 directly, the secondary inductor 320 may be aligned by direct visual observation. However, where the primary inductor 220 is concealed behind an opaque surface, alternative alignment mechanisms 500 may be necessary. Such alignment mechanisms 500 may include tactile, visual and/or audible indications, for example.

The magnetic flux guide 600 is provided to guide magnetic flux from the primary inductor 220 to the secondary inductor 320 and to prevent flux leakage out of the inductive power transfer system 100, particularly into metallic or other conductive materials in the vicinity.

Prior art inductive power transfer systems have typically been either inefficient or impractical for powering electrical devices wirelessly. As a result, in spite of the long felt need to reduce trailing wires, the use of inductive power transfer has been generally limited to low power applications such as the charging of batteries. In order to be practical, an inductive power transfer system must be efficient, safe and unobtrusive, preferably having small dimensions and being lightweight. As will be described hereinbelow, embodiments of the present invention are directed towards providing an inductive power transfer system which answers these requirements.

Particular aspects of the current invention include: a transmission-guard for preventing the inductive power outlet 200 from transmitting power in the absence of an inductive power receiver 300; an AC-DC rectifier 330 which uses electronic switches for reducing heat loss from diodes; an inductive power receiver 300 having a heat dissipation system such that a user may comfortably and safely handle the inductive power receiver 300; a magnetic flux guide 600 constructed from thin materials and which is adapted to improve flux linkage between the primary inductor 220 and the secondary inductor 320 as well as to prevent flux leakage into the surroundings; a driver 230 configured and operable to generate a driving voltage which oscillates at a transmission frequency which is substantially different from the resonant frequency of the inductive couple.

Any one of the above described aspects by itself represents a significant improvement to the prior art. However, it is particularly noted that for any inductive power transfer system 100 to be practical for powering electrical devices, it needs to incorporate at least two or more of the above described features in combination. More detailed descriptions of embodiments of the invention which incorporate these features are given below.

Transmission-Guard

Figure 2A:
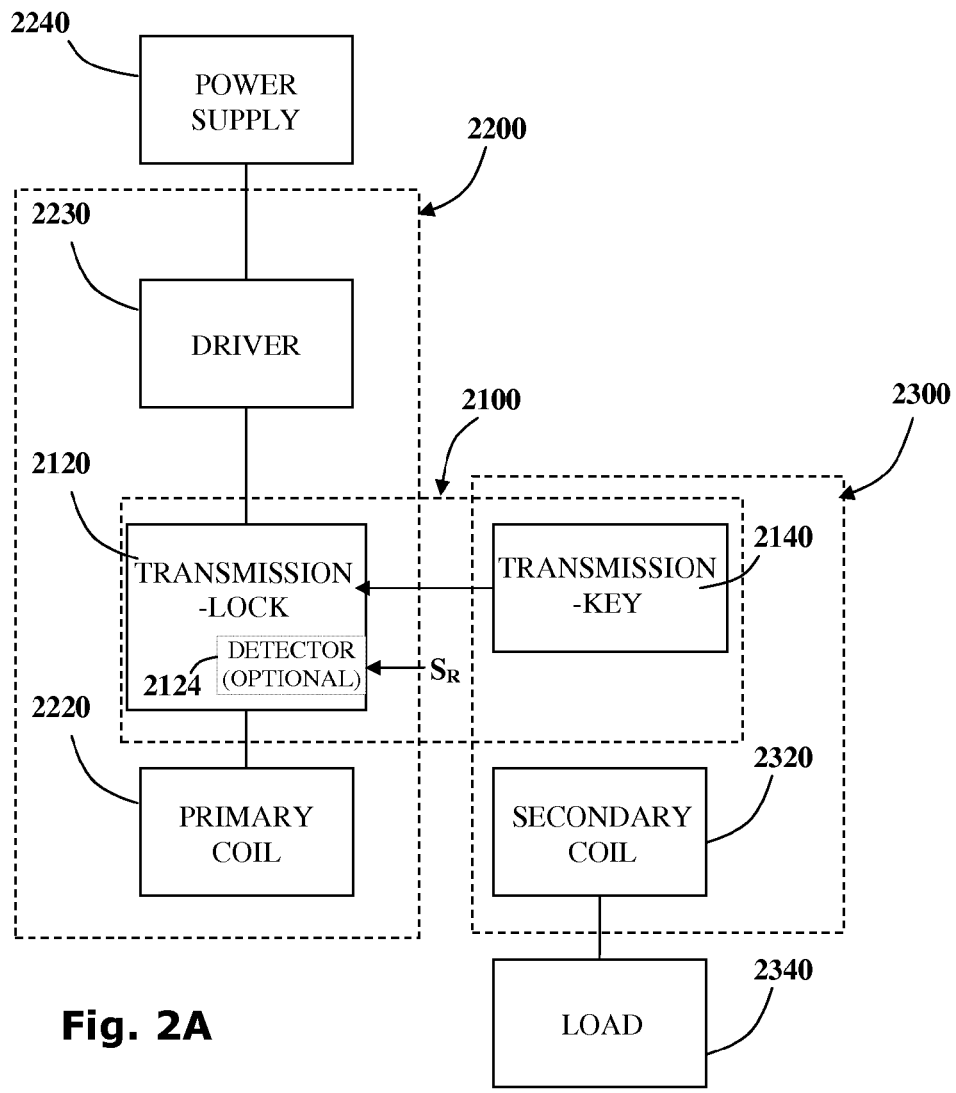
FIG. 2A is a block diagram representing the main components of a transmission-guard for an inductive power outlet according to another embodiment of the present invention.

Reference is now made to FIG. 2A which shows a block diagram representing a transmission-guard 2100 for preventing an inductive power outlet 2200 from transmitting power in the absence of a secondary unit 2300 connected to an electric load 2340, according to another embodiment of the invention.

The inductive power outlet 2200 consists of a primary coil 2220, wired to a power supply 2240, for inductively coupling with a secondary coil 2320 wired to an electric load 2340. The primary coil 2220 is wired to the power supply 2240 via a driver 2230 which provides the electronics necessary to drive the primary coil 2220. Driving electronics may include a switching unit providing a high frequency oscillating voltage supply, for example. Where the power outlet 2200 consists of more than one primary coil 2220, the driver 2230 may additionally consist of a selector for selecting which primary coil 2220 is to be driven.

It is a particular feature of this embodiment of the invention that a transmission-guard 2100 is provided consisting of a transmission-lock 2120 connected in series between the power supply 2240 and the primary coil 2220. The transmission-lock 2120 is configured to prevent the primary coil 2220 from connecting to the power supply 2240 unless it is released by a transmission-key 2140. The transmission-key 2140 is associated with the secondary unit 2300 and serves to indicate that the secondary coil 2320 is aligned to the primary coil 2220.

Figure 2B:
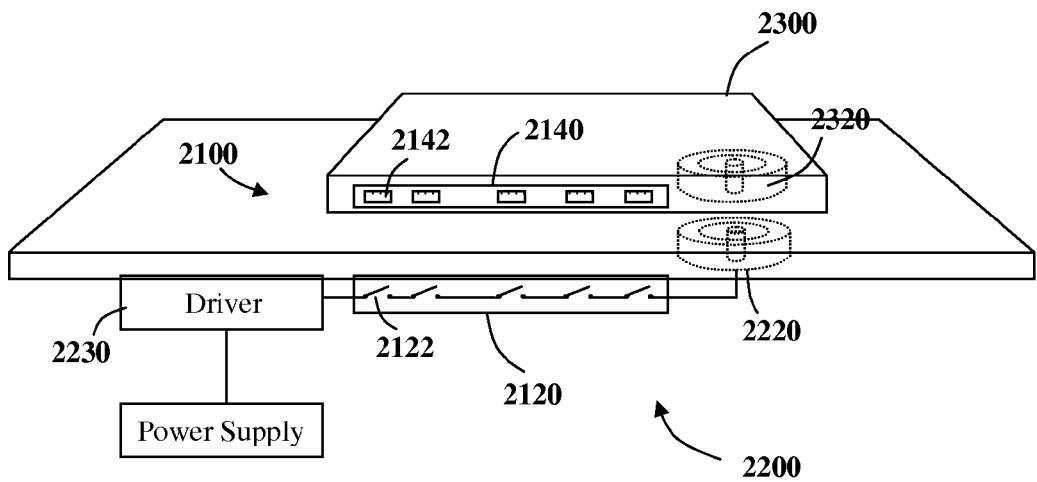
FIG. 2B is a schematic representation of an inductive power outlet protected by an exemplary transmission-guard according to a further embodiment of the present invention wherein a transmission-lock is released by a magnetic key.

With reference to FIG. 2B, a schematic representation is shown of an inductive power outlet 2200 protected by an exemplary magnetic transmission-guard 2100 according to another embodiment of the present invention. Power may only be provided by the protected power outlet 2200 when an authenticated secondary unit 2300 is aligned thereto.

The protected power outlet 2200 includes a magnetic transmission-lock 2120 consisting of an array of magnetic switches 2122 electrically connected in series between the primary coil 2220 and the driver 2230. A magnetic transmission-key 2140 consisting of an array of magnetic elements 2142 is provided within the authenticated secondary unit 2300.

The configuration of magnetic elements 2142 in the transmission-key 2140 is selected to match the configuration of magnetic switches 2122 in the transmission-lock 2120. The authenticated secondary unit 2300 may be aligned with the protected induction outlet 2200 by aligning both the transmission-key 2140 with the transmission-lock 2120 and the secondary coil 2320 with the primary coil 2220. Once correctly aligned, all the magnetic switches 2122 in the transmission-lock 2120 are closed and the driver 2230 is thereby connected to the primary coil 2220.

Various examples of magnetic switches 2122 are known in the art including for example reed switches, Hall-effect sensors or such like. Such magnetic switches 2122 may be sensitive to any magnetic elements 2142 such as either North or South poles of permanent magnets or electromagnetic coils for example. It is further noted that Hall-effect sensors may be configured to sense magnetic fields of predetermined strength.

According to certain embodiments, the magnetic transmission-key 2140 may consist of a permanent magnet and a ferromagnetic element incorporated with in the secondary unit 2300. The characteristics of the magnetic field produced by a transmission-key of this type depend upon the strength and position of the permanent magnetic as well as the dimensions and characteristics of the ferromagnetic element. The magnetic transmission-lock 2120 may consist of an array of magnetic switches, such as unipolar Hall switches for example, which are strategically placed and orientated such that they connect the primary coil 2220 to the driver 2230 only when triggered by a particular combination of a permanent magnet and ferromagnetic element.

It is noted that permanent magnets may commonly be provided to assist with alignment of the secondary coil 2320 to the primary coil 2220. Ferromagnetic elements may also be commonly included in secondary units 2300 for providing flux guidance from the primary coil 2220 to the secondary coil 2320. The magnetic transmission-lock 2120 may therefore be made sensitive to these components. Indeed a single magnetic transmission-lock 2120 may be provided which is configured to detect various secondary units and to selectively connect more than one primary coil 2220 depending on the secondary unit detected.

Referring back to FIG. 2A, according to other embodiments of the transmission-guard 2100, a power outlet 2200 may be protected by a transmission-lock 2120 which may be released when a release signal $S_R$ is received by a detector 2124. The release signal $S_R$ may be actively emitted by the transmission-key 2140 or alternatively the transmission-key may passively direct the release signal towards the detector 2124.

Figure 2C:
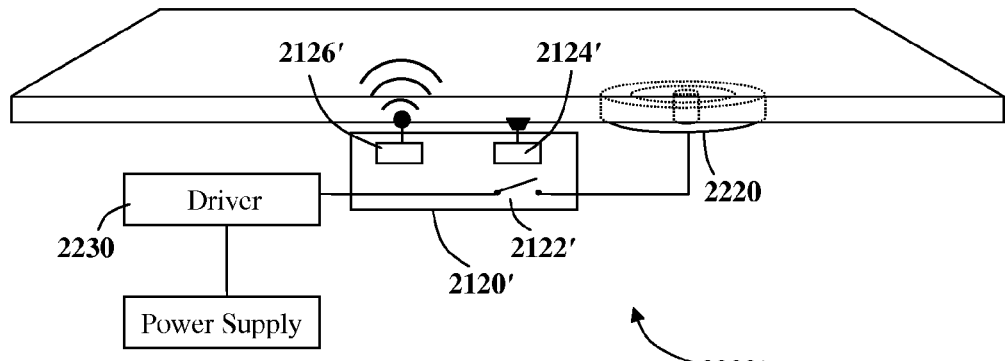
FIGS. 2C-E are schematic representations of a transmission-guard according to another embodiment of the invention in which a transmission-lock is releasable by a passive optical transmission-key.
Figure 2D:
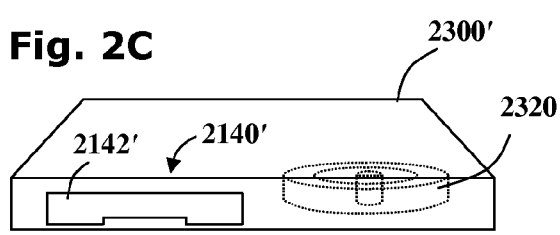
Figure 2E:
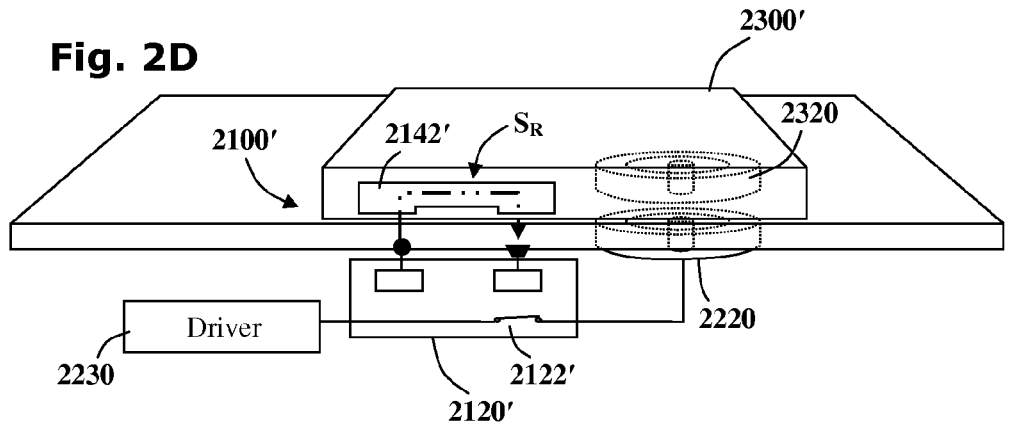

One example of a passive transmission-key 2140 is shown in FIGS. 2C-E which represents an optical transmission-guard 2100 according to a further embodiment of the invention.

The transmission-guard 2100 consists of an active optical transmission-lock 2120' incorporated within an inductive power outlet 2200' and a passive optical transmission-key 2140' incorporated within the secondary unit 2300.

With particular reference to FIG. 2C, the optical transmission-lock 2120' includes a switch 2122', an optical detector 2124', such as a photodiode, a phototransistor, a light dependent resistor or the like, and an optical emitter 2126' such as light emitting diode (LED). The switch 2122' is normally open but is configured to close when a release signal $S_R$ is received by the optical detector 2124', thereby connecting a primary coil 2220 to a driver 2230. The optical emitter 2126' is configured to emit the optical release-signal $S_R$ which is not directly detectable by the optical detector 2124'.

Referring now to FIG. 2D, the optical transmission-key 2140' includes a bridging element 2142' such as an optical wave-guide, optical fiber, reflector or the like. The bridging element 2142' is configured to direct the optical release-signal $S_R$ from the optical emitter 2124' towards the optical detector 2126', when a secondary coil 2320 is aligned with the primary coil 2220.

When the secondary unit 2300 is correctly aligned with the inductive power outlet 2200, as shown in FIG. 2E, the secondary coil 2320 aligns with the primary coil 2220' and the passive optical transmission-key 2140' aligns with the optical transmission-lock 2120'. The optical release-signal $S_R$ is thus detected by the optical detector 2126' and the switch 2122' is closed connecting the primary coil 2220 to the driver 2230.

It is noted that many materials are partially translucent to infra-red light. It has been found that relatively low intensity infrared signals from LEDs and the like, penetrate several hundred microns of common materials such as plastic, cardboard, Formica or paper sheet, to a sufficient degree that an optical detector 2124', such as a photodiode, a phototransistor, a light dependent resistor or the like, behind a sheet of from 0.1 mm to 2 mm of such materials, can receive and process the signal. For example a signal from an Avago HSDL-4420 LED transmitting at 850 nm over 24 degrees, may be detected by an Everlight PD 15-22C-TR8 NPN photodiode, from behind a 0.8 mm Formica sheet. For signaling purposes, a high degree of attenuation may be tolerated, and penetration of only a small fraction, say 0.1% of the transmitted signal intensity may be sufficient.

Although an optical transmission-key 2140' is described above, it will be appreciated that other passive transmission-keys may incorporate bridging elements configured to guide release-signals of other types. For example, a ferromagnetic bridge may be incorporated for transmitting magnetic release-signal from a magnetic element to a magnetic detector such as a Hall-effect sensor or the like. The magnetic emitter in such a case may be the primary coil itself.

Alternatively, audio signals may be guided through dense elements, or low power microwaves along microwave wave guides for example.

Figure 2F:
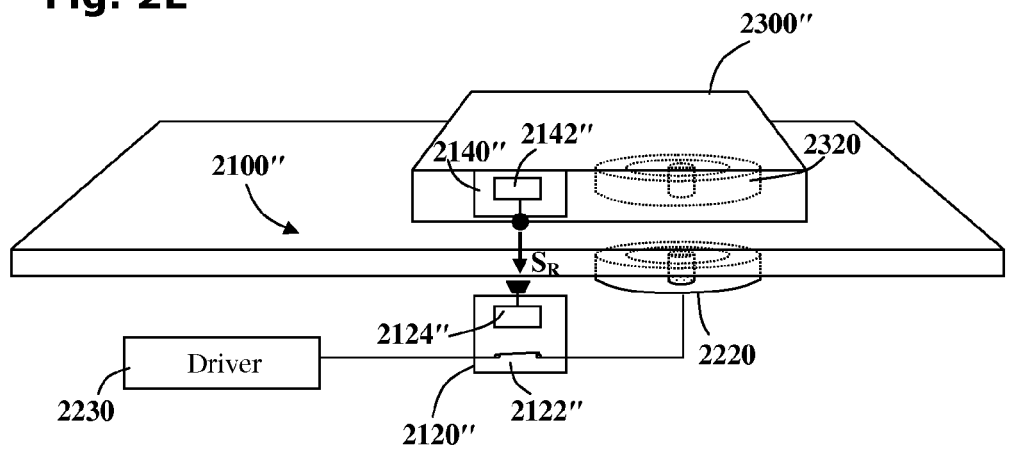
FIG. 2F is a schematic representation of a transmission-guard according to a further embodiment of the invention in which a transmission-lock is releasable by an active optical transmission-key.

An example of an active optical transmission-key 2140" is shown in FIG. 2F representing a transmission-guard 2100" according to another embodiment of the invention.

The transmission-guard 2100" of this embodiment includes a transmission-lock 2120" incorporated within an inductive power outlet 2200 and an active optical transmission-key 2140" incorporated within secondary unit 2300.

The active optical transmission-key 2140" includes an optical emitter 2142", configured to emit an optical release-signal $S_R$, and the transmission-lock 2120" includes a switch 2122" and an optical detector 2124". The transmission-lock 2120" is configured to close the switch 2122" thereby connecting a primary coil 2220 to a driver 2230 when the optical detector 2124" receives the release-signal $S_R$.

When the secondary unit 2300 is aligned with the inductive power outlet 2200, the transmission-key 2140" emits an optical release-signal $S_R$ which is received by the optical detector 2124" of the transmission-lock 2120" and this closes the switch 2122". Thus the inductive power outlet 2200" is enabled to transfer power to the secondary coil 2320.

It will be appreciated that a release signal $S_R$ may be coded to provide a unique identifier. Coding may be by modulation of frequency, pulse frequency, amplitude or the like. The code may be used, for example, to identify the type or identity of the secondary unit for authentication. Other data may additionally be encoded into the release-signal. This data may include required power transmission parameters, billing information or other information associated with the use of the power outlet.

Although an optical active transmission-key 2140" is described above, it will be appreciated that other active transmission-keys may emit other types of release-signals. For example, the secondary coil 2320 may be used to transmit a magnetic release-signal to a magnetic detector incorporated in the transmission-lock. This could be a Hall-effect sensor or the like or even the primary coil 2220 itself.

To actively emit a release-signal transmission-keys typically require a power source. In some cases, particularly where the secondary unit is incorporated into a portable electrical device, power may be provided by internal power cells with the secondary unit. Alternatively, power may be drawn from a power pulse transferred from the primary coil to the secondary coil.

In certain embodiments of the invention, the inductive power outlet transfers a periodic low energy power pulse, for example a pulse of a few milliseconds duration may be transmitted by the primary coil at a frequency of 1 hertz or so. When a secondary coil is brought into the vicinity of the primary coil the power may be transferred to the secondary coil and may be used to power an active transmission-key.

In other embodiments of the transmission-guard, a first transmission-lock (preferably a passive transmission-lock) associated with the secondary unit, releases a first transmission-lock thereby indicating the probable presence of a secondary coil. A low energy power pulse is then emitted by the primary coil to power an active second transmission-key which may release a second transmission-lock thereby connecting the primary coil to a driver.

Synchronous Rectifier

Reference is now made to FIG. 3A showing a circuit diagram of a typical full-wave rectifier 3100 of the prior art. The rectifier has two input terminals $T_1$ and $T_2$ and two output terminals $T_3$ and $T_4$. When an alternating current source $AC_{in}$ is wired to the two input terminals $T_1$ and $T_2$, a direct current output $DC_{out}$ may be drawn from the two output terminals $T_3$ and $T_4$ of the rectifier 3100.

Four diodes $D_{1-4}$ are arranged so that two diodes $D_1$ and $D_2$ form a first branch 3110 of a Graetz circuit and the other two diodes $D_3$ and $D_4$ form a second branch 3120 of the Graetz circuit. The anodes of two upstream diodes $D_1$ and $D_3$ are wired to the first output terminal $T_3$ and the cathodes of the two downstream diodes $D_2$ and $D_4$ are wired to the second output terminal $T_4$. The cathode of the first upstream diode $D_1$ and the anode of first downstream diode $D_2$ are wired to the first input terminal $T_1$ and the cathode of the second upstream diode $D_3$ and the anode of second downstream diode $D_4$ are wired to the second input terminal $T_2$.

When the polarity of the first input terminal $T_1$ is positive relative to the second input terminal $T_2$, current flows through the first downstream diode $D_2$ and through the second upstream diode $D_3$ When the polarity of the first input terminal $T_1$ is negative relative to the second input terminal $T_2$, current flows through the second downstream diode $D_4$ and through the first upstream diode $D_1$.

Diode bridge rectifiers, such as that shown in FIG. 3A, are used to produce an output with a fixed polarity that is independent of the polarity of the input. Such diode bridge rectifiers may be used in AC-to-DC power converters, for example. Optionally, the output is smoothed by a smoothing capacitor C.

It will be appreciated that power is lost from each diode with each reversal of polarity. In high frequency power converters, where the polarity of the input terminals $T_1$ and $T_2$ may oscillate at a frequencies of 100 kHz or more, such power losses may result in significant heating of the bridge circuit and its surrounding components, which may result in reduced reliability or failure.

Figure 4A:
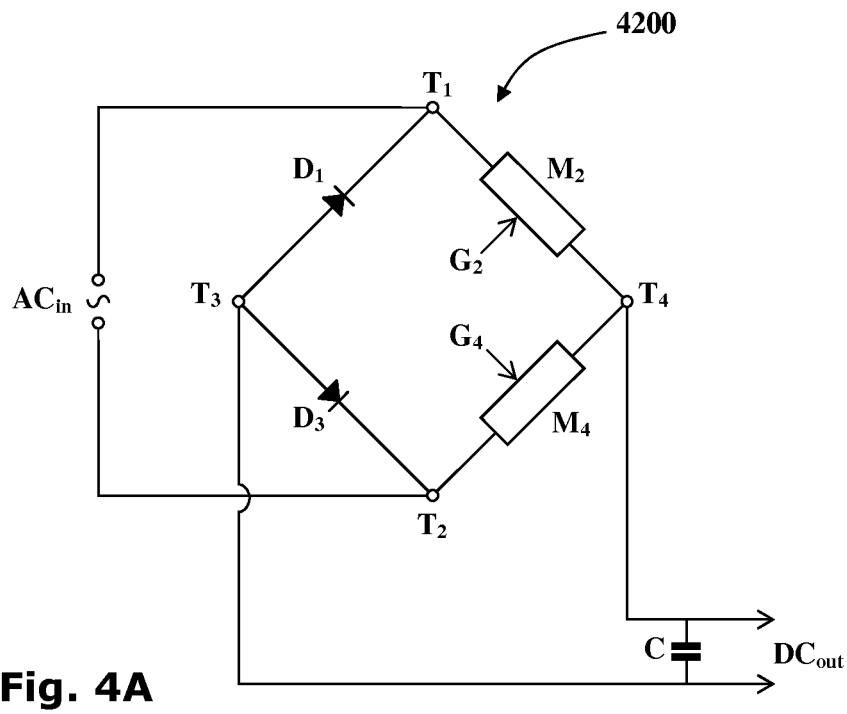
FIG. 4A is a block diagram of a first synchronous full-wave rectifier in which two of the diodes of the diode bridge of FIG. 3 have been replaced by electronic switches.

Power loss may be reduced by replacing diodes with electronic switches, such as the Power MOSFETs shown in FIG. 3A, which have much lower associated power loss. FIG. 4A is a block diagram of one such synchronous full-wave rectifier 4200 in which the first downstream diode $D_2$ and the second downstream diode $D_4$ of the diode bridge of FIG. 3A have been replaced by two electronic switches $M_2$ and $M_4$.

The electronic switches $M_2$ and $M_4$ are controlled by switching signals $G_2$ and $G_4$ which switch them between the ON and OFF states. The switching signal $G_2$ controlling the electronic switch $M_2$ must be synchronized to switch to the ON state whenever the polarity of the first input terminal $T_1$ is positive relative to the second input terminal $T_2$. The switching signal $G_4$ controlling the electronic switch $M_4$ must be synchronized to switch to the ON state whenever polarity of the first input terminal $T_1$ is negative relative to the second input terminal $T_2$.

Typically, this synchronization is achieved by drawing the first switching signal $G_2$ from the voltage of the second input terminal $T_2$ and drawing the second switching signal $G_4$ from the voltage of the first input terminal $T_1$.

The above described synchronous full-wave rectifier 4200 in which two diodes are replaced by MOSFETs may reduce power loss from the rectifier by up to 50% as compared with the diode bridge rectifier 4100 of the prior art. Where further reduction in power loss is required it would be desirable to replace the remaining two diodes $D_1$ and $D_3$ with electronic switches. However, it is much more difficult to synchronize four electronic switches without inadvertently causing short circuits between either the input or output terminals.

Figure 4B:
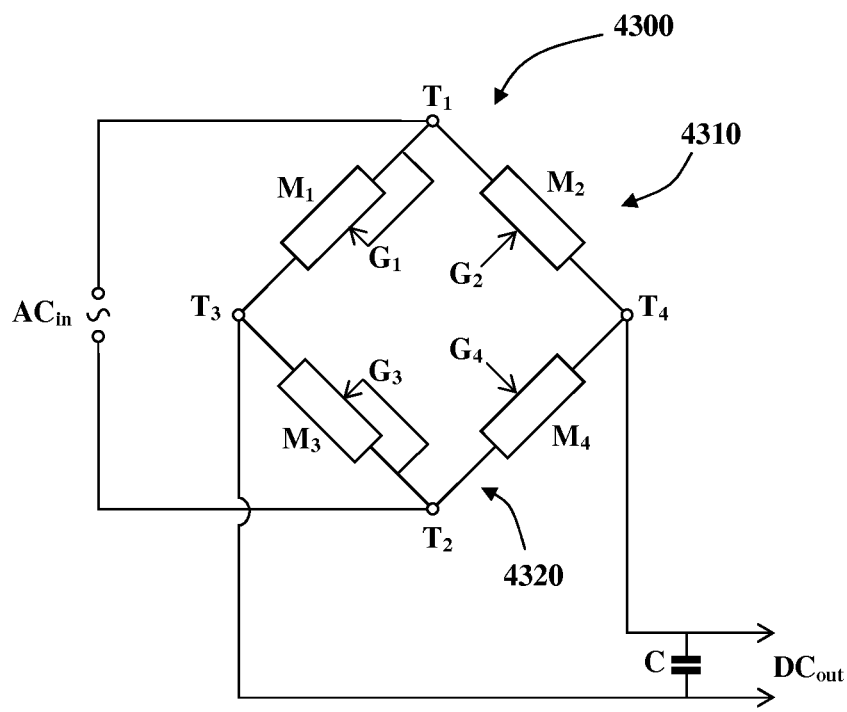
FIG. 4B is a block diagram of a second synchronous full-wave rectifier according to an exemplary embodiment of the invention in which all four diodes of the diode bridge of FIG. 3 have been replaced by electronic switches.

FIG. 4B is a block diagram of a second synchronous full-wave rectifier 4300 in which all four diodes $D_{1-4}$ of the diode bridge of FIG. 3A have been replaced by electronic switches $M_{1-4}$. In order to provide an output $DC_{out}$ of constant polarity, the switching signals $G_{1-4}$ need to be carefully controlled.

When the polarity of the first input terminal $T_1$ is positive relative to the polarity of the second input $T_2$, the first upstream and second downstream electronic switches $M_1$ and $M_4$ must be switched to the OFF state and the first downstream and second upstream electronic switches $M_2$ and $M_3$ must be switched to the ON state. When the polarity of the first input terminal $T_1$ is negative relative to the polarity of the second input terminal $T_2$, the first upstream and second downstream electronic switches $M_1$ and $M_4$ must be switched to the ON state and the electronic switches first downstream and second upstream electronic $M_2$ and $M_3$ must be switched to the OFF state.

Synchronization of the switching signals $G_{1-4}$, is complicated by an additional constraint. In order to prevent shorting across the output terminals, the upstream and downstream electronic switches along a common branch 4310, 4320 must never be in the ON state at the same time. In practice, when both of the switching signals $G_1$ and $G_2$ controlling the two electronic switches $M_1$ and $M_2$ along the first branch 4310 are each drawn from one of the input terminals $T_1$ and $T_2$, the two switches $M_1$ and $M_2$ are periodically both in their ON states. Because the switches $M_1$ and $M_2$ are adjacent along the first branch 4310 of the circuit, a short circuit is formed between the output terminals $T_3$ and $T_4$. Similar shorting may occur along the second branch 4320 when the switching signals $G_3$ and $G_4$ which control the other two electronic switches $M_3$ and $M_4$ are each drawn from one of the input terminals $T_1$ and $T_2$.

According to preferred embodiments of the invention, only the switching signals $G_2$ and $G_4$ for the downstream electronic switches $M_2$ and $M_4$ are drawn directly from the voltage at the input terminals $T_1$ and $T_2$ whilst the switching signals $G_1$ and $G_3$ for the upstream switches $M_1$ and $M_3$ are controlled independently. Preferably, the switching signals $G_1$ and $G_3$ are responsive to changes in the cathode current of switches $M_1$ and $M_3$ respectively.

Figure 4C:
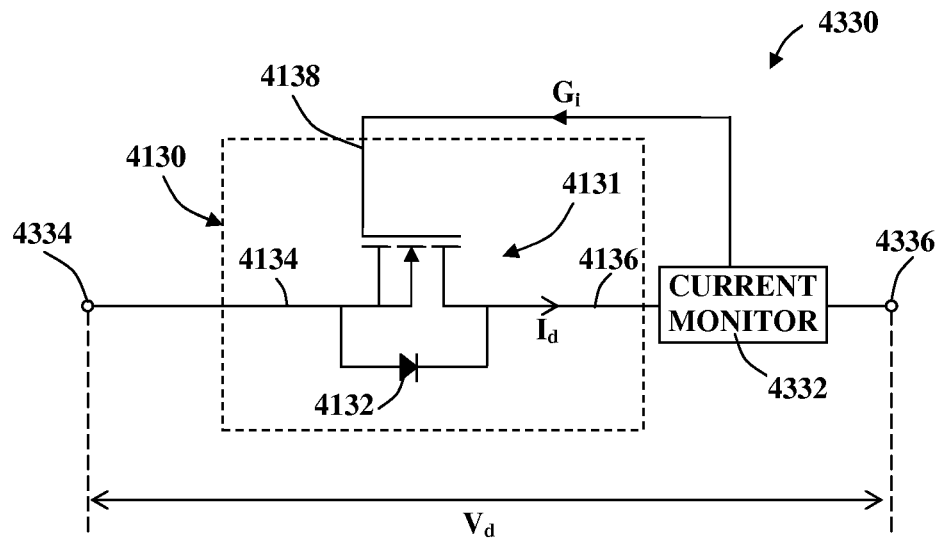
FIG. 4C is a schematic diagram showing a current triggered Power MOSFET which draws a gate signal from the current flowing through its drain terminal.

FIG. 4C shows an exemplary current-triggered synchro-rectifier 4330, which may serve as an electronic switch M incorporated into a bridge synchro-rectifier 4300. The current-triggered synchro-rectifier 4330 includes a Power MOSFET 4130, such as that shown in FIG. 3B, and a current monitor 4332. The current monitor 4332 is wired to the drain terminal 4136 of the Power MOSFET 4130 and is configured to send a current-based gate signal $G_i$ to the gate terminal 4138 of the Power MOSFET when the drain-current $I_d$ exceeds a predetermined threshold Although in the above example the current-triggered synchro-rectifier 4330 includes an n-channel MOSFET 4130, it will be appreciated that in other embodiments current-triggered synchro-rectifiers may incorporate p-channel MOSFETs.

Figure 4D:
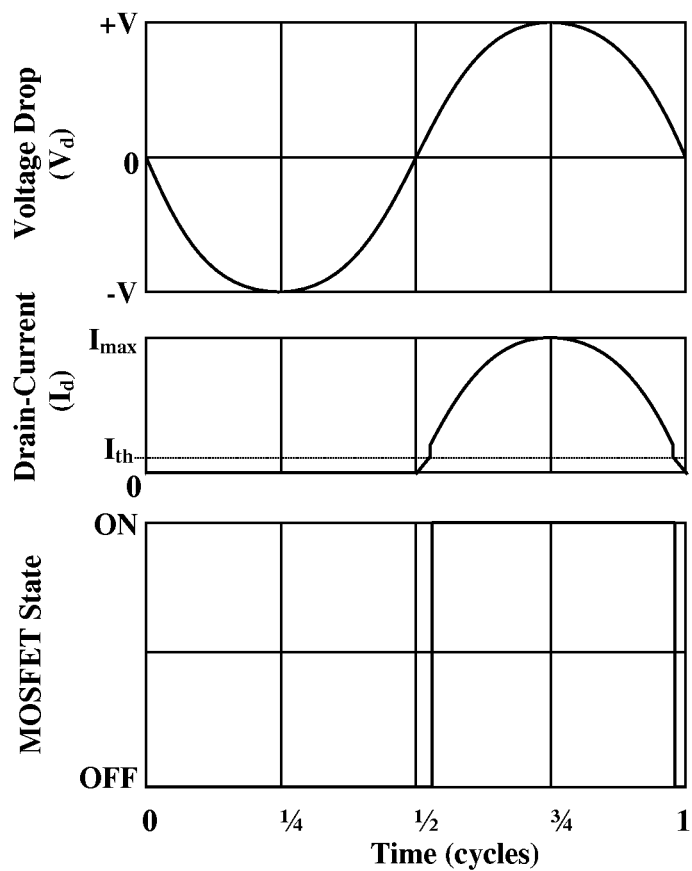
FIG. 4D is a graphical representation of the variations in drain-current and state of the MOSFET of FIG. 4C, over a single cycle of a sinusoidal input voltage.

In order to understand the functioning of the current-triggered synchro-rectifier 4330 consider the case where a sinusoidal alternating voltage is connected across the cathode 4334 and the anode 4336 terminals of the current-triggered synchro-rectifier 4330. FIG. 4D shows three graphs showing variations in 1) the voltage drop $V_d$ from the cathode 4334 to the anode 4336, 2) the drain-current $I_d$, and 3) the MOSFET state during one voltage cycle.

For the first half of the sinusoidal cycle the voltage drop $V_d$ between the cathode 4334 and the anode 4336 is negative, thus the polarity of the cathode 4334 is negative relative to the anode 4336. Consequently, no current flows through the drain-terminal 4136 and the MOSFET remains in the OFF state.

At the beginning of the second half of the sinusoidal cycle, the voltage drop $V_d$ between the cathode 4334 and the anode 4336 increases above zero. The polarity of the cathode 4334 becomes positive relative to the anode. 4336 so a small drain-current $I_d$ begins to flow through the diode 4132. This current is measured by the current monitor 4332.

During the third quarter of the cycle, the voltage drop $V_d$ between the cathode 4334 and the anode 4336 continues to rise. The current monitor 4332 measures an increasing drain-current $I_d$.

When the drain-current $I_d$ exceeds the predetermined threshold $I_{th}$, the current-based gate signal $G_i$ triggers the MOSFET 4130 to switch to the ON state.

As long as the MOSFET 4130 is in the ON state, current flows through the ohmic conductive path of the electronic switch 4131. Consequently, the drain-current $I_d$ varies in proportion to the voltage drop $V_d$.

During the last quarter of the cycle, the voltage drop $V_d$ between the cathode 4334 and the anode 4336 decreases. The current monitor 4332 measures a decreasing drain-current $I_d$.

When the drain-current falls below the predetermined threshold $I_{th}$, the current-based gate signal $G_i$ triggers the MOSFET 4130 to switch to the OFF state.

Figure 4E:
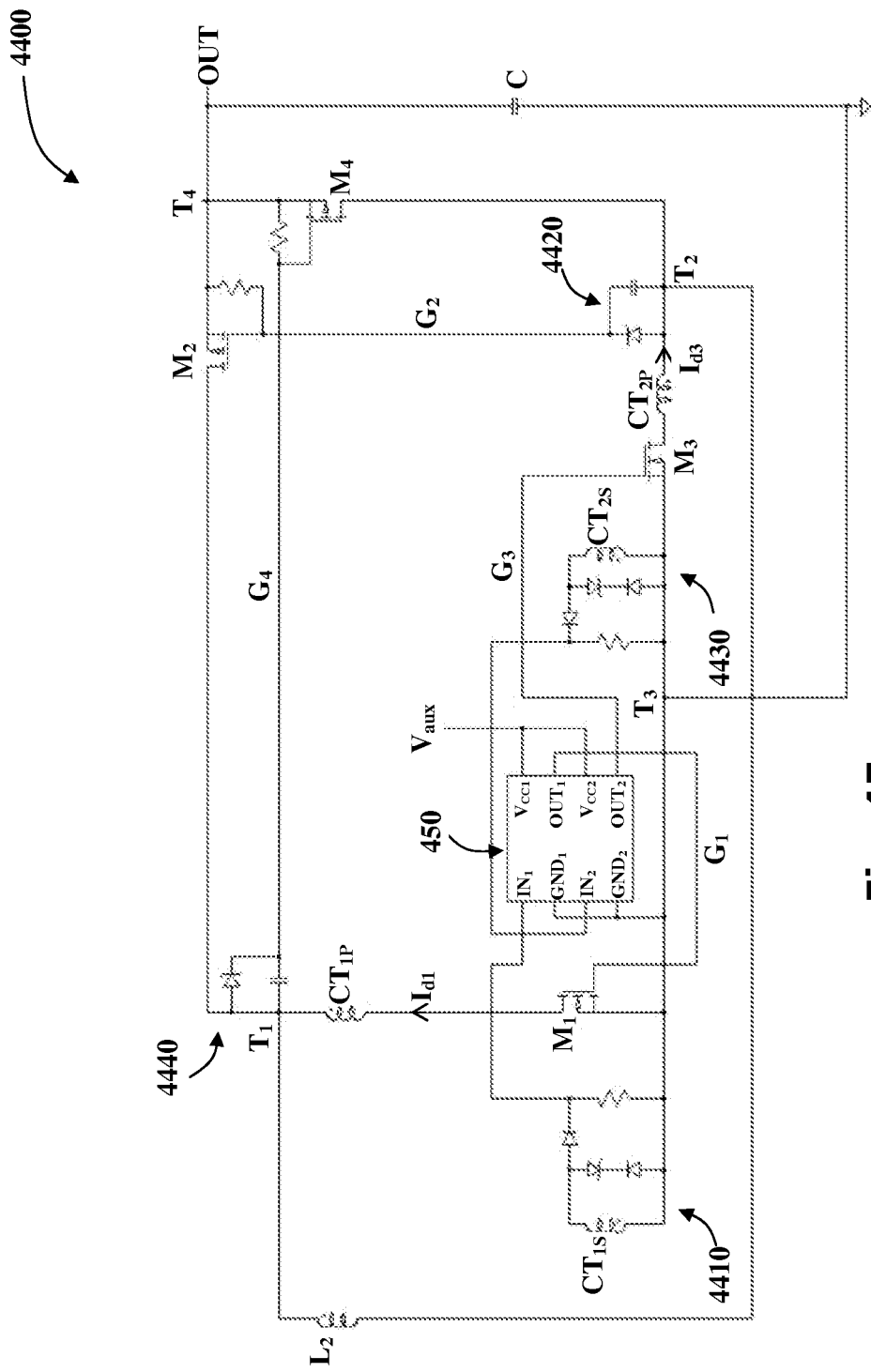
FIG. 4E is a circuit diagram representing a synchronous full-wave MOSFET bridge rectifier according to another embodiment of the invention.

FIG. 4E is a circuit diagram representing a synchronous full-wave bridge rectifier 4400 incorporated within an inductive power receiver according to a further embodiment of the invention. The electronic switches $M_{1-4}$ are all MOSFET transformers having three terminals: a source terminal, a drain terminal and a gate terminal. The upstream MOSFETs $M_1$ and $M_3$ are both n-channel MOSFETs and their source terminals are both wired to the first output terminal $T_3$ of the rectifier. The downstream MOSFETs $M_2$ and $M_4$ are both p-channel MOSFETs and their source terminals are both wired to the second output terminal $T_4$ of the rectifier. The drain terminals of the first upstream MOSFET $M_1$ and the first downstream MOSFET $M_2$ are both wired to the first input terminal $T_1$ of the rectifier and the drain terminals of the second upstream MOSFET $M_3$ and the second downstream MOSFET $M_4$ are both wired to the second input terminal $T_3$ of the rectifier.

The input terminals $T_1$ and $T_2$ are wired to a secondary coil $L_2$ of a power transformer which is inductively coupled to a primary coil (not shown). The secondary coil $L_2$ provides an alternating current input to the two input terminals $T_1$ and $T_2$.

The gate terminals of the downstream MOSFETs $M_2$ and $M_4$ are wired to the input terminals $T_2$ and $T_1$ via smoothing circuits 4420, 4440 respectively. The switching signals $G_2$ and $G_4$, are therefore in out of phase with each other.

The gate terminals of the upstream MOSFETs $M_1$ and $M_3$ receive switching signals $G_1$ and $G_3$ driven by their own drain-currents $I_{d1}$ and $I_{d3}$. The drain current $I_{d1}$ of the first upstream MOSFET $M_1$ is monitored by a first current transformer 4410, in which a primary current monitor coil $CT_{1P}$ transfers the current signal to a secondary current monitor $CT_{2S}$ the output of which is rectified and relayed to a first input $IN_1$ of a driver 4450 which amplifies the signal before outputting a signal from a first output $OUT_1$. This first output signal from the driver is then fed back to the first upstream MOSFET $M_1$ such that when the drain current $I_{d1}$ exceeds a threshold value the MOSFET $M_1$ switches itself to the ON state. This produces a switching signal $G_1$ at the same frequency as the alternating current input $AC_{in}$.

Similarly the drain current $I_{d3}$ of the second upstream MOSFET $M_2$ is monitored by a second current transformer 4430, in which a primary current monitor coil $CT_{2P}$ transfers the current signal to a secondary current monitor $CT_{2S}$ the output of which is rectified and relayed to a second input $IN_2$ of the driver 4450 which amplifies the signal before outputting a signal from a second output $OUT_2$. The second output signal from the driver is then fed back to the second upstream MOSFET $M_3$ such that when the drain current $I_{d2}$ exceeds a threshold value the MOSFET $M_3$ switches itself to the ON state. This produces a switching signal $G_3$ at the same frequency as the alternating current input $AC_{in}$.

Although in the example hereabove, current transformers 4410, 4430 are used to monitor the drain-currents $I_{d1}$, $I_{d2}$, in alternative embodiments other current monitors such as ammeters, galvanometers, Hall effect sensors or the like may be preferred.

Heat Dissipation within Inductive Power Receivers

Figure 5A:
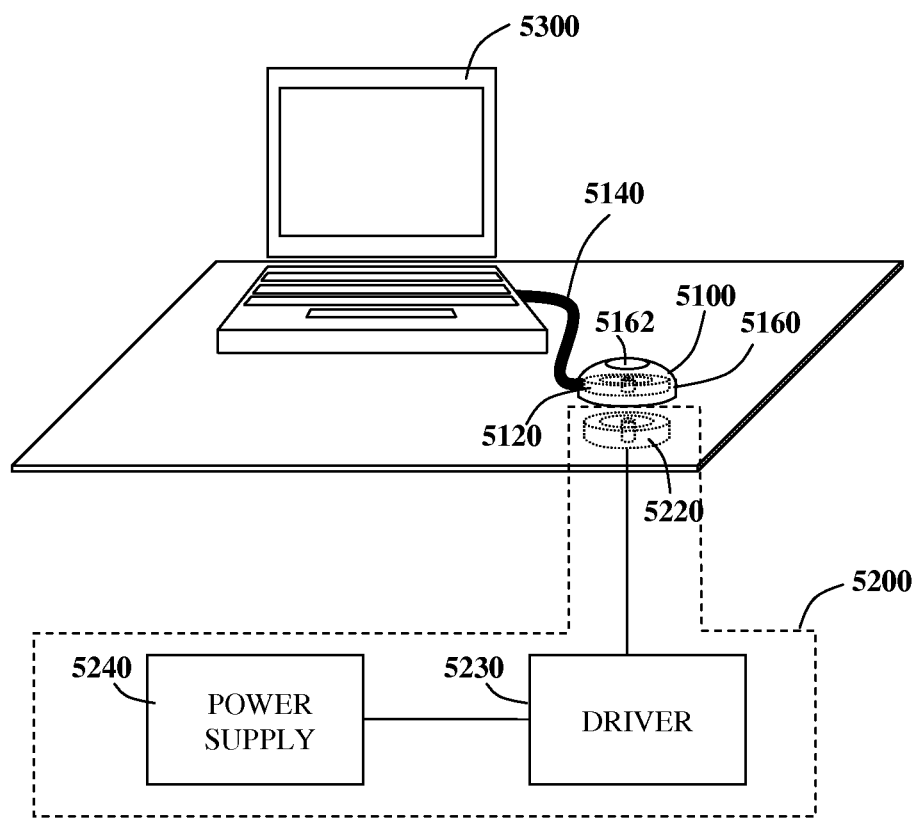
FIG. 5A shows schematic diagram of a computer being powered by an inductive power outlet via an inductive power adapter according to a further embodiment of the present invention.

Reference is now made to FIG. 5A showing a laptop computer 5300 drawing power from an inductive power outlet 5200 via an inductive power adapter 5100, according to a further embodiment of the present invention. The adaptor is configured such that it can be safely handled by a user while it is operation.

The power adapter 5100 includes an inductive receiver 5120, housed in a casing 5160 and a power connector 5140 for connecting to an electrical device, such as the computer 5300. The inductive receiver 5120 includes a secondary inductor 5122 configured to couple with a primary inductor 5220 in the power outlet 5200. Typically, the primary inductor 5220 is wired to a power source 5240 via a driver 5230. The driver 5230 provides an oscillating driving voltage to the primary inductive coil 5220.

Preferably, an alignment mechanism (not shown) is provided for aligning the secondary inductor 5122 to the primary core 5220. The alignment mechanism may consist of a primary magnetic element in the inductive outlet configured to snag and/or engage a secondary magnetic element in the power adaptor 5100.

It will be appreciated that electrical components of power converters generate heat. There are a number of problems associated with the heat generated in an inductive receiver 5120, particularly in systems running at high power above say 50 W or 100 W. Heat produces high temperatures which can reduce overall efficiency and may also reduce the reliability of components. Much design effort is typically required to overcome this problem, and other factors such as the dimensions of the system may be compromised as a result.

In practice, electrical components of the power adapter 5100 are selected which function at high temperatures. However, the maximum temperature of the casing 5160 is further constrained by the requirement that it is to be handled by the user. If the casing 5160 reaches high temperatures, above 50 degrees Celsius or so, a user may find handling the adapter to be unpleasant and may even be at risk of injury. In order to allow a user to comfortably and safely handle the adaptor 5100, it is a particular feature of the present invention that a heat dissipation system for directing heat away from the hand grip 5162.

Figure 5B:
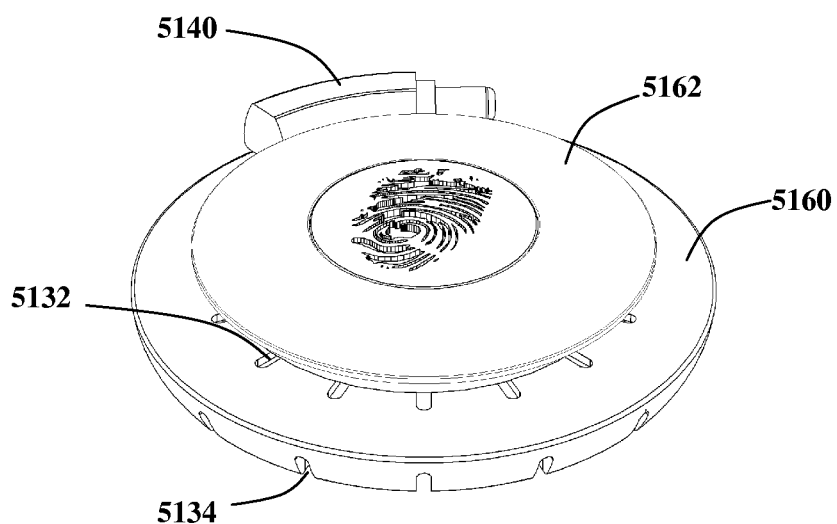
FIG. 5B is an isometric projection of an inductive power adapter according to an exemplary embodiment of the invention.
Figure 5C:
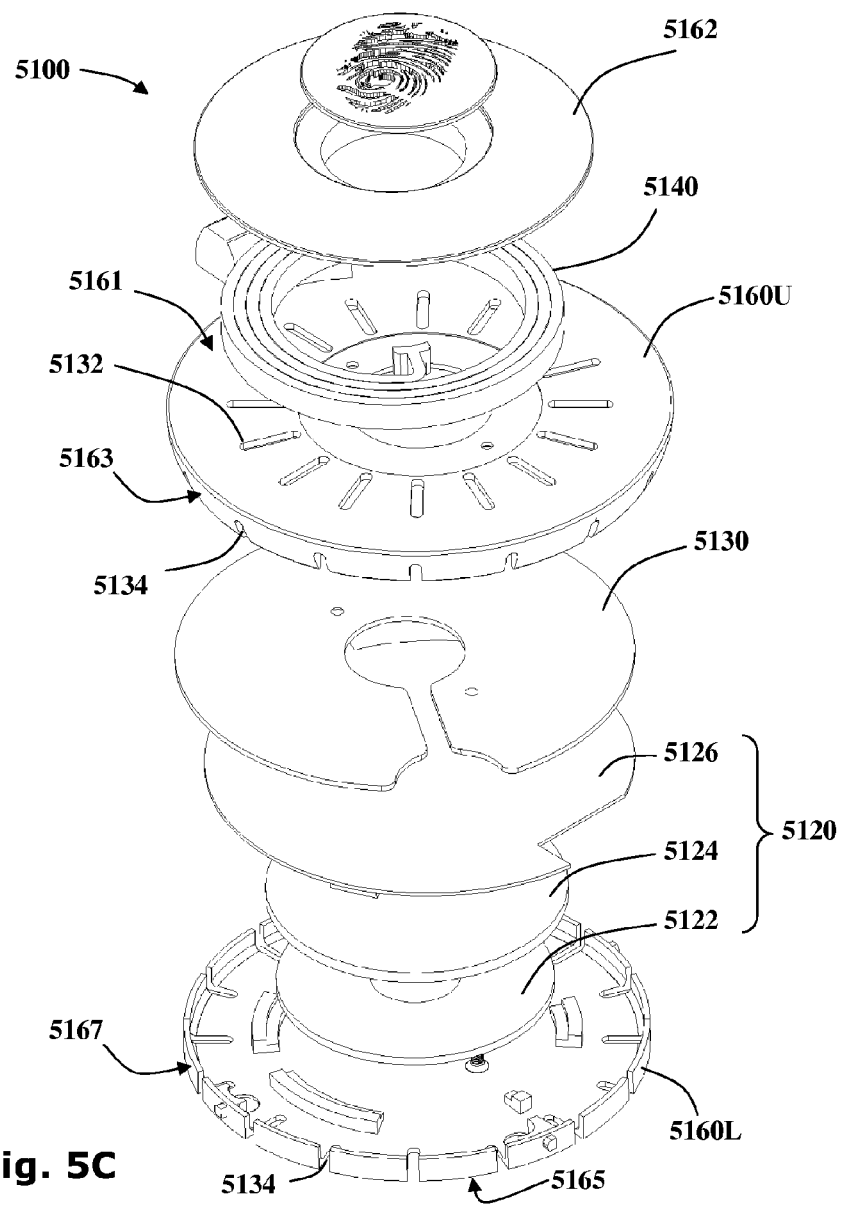
FIG. 5C is an exploded view showing the internal components of the power receiver of the exemplary embodiment.
Figure 5D:
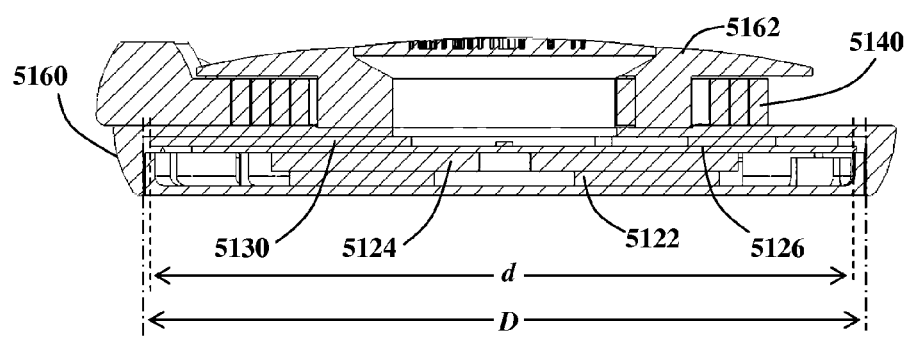
FIG. 5D is a side view cross section of the power receiver of the exemplary embodiment.

The heat dissipation system may be better understood with reference to FIGS. 5B-D showing an exemplary inductive power adapter 5100 according to another embodiment of the invention. FIG. 5B shows an isometric projection, FIG. 5C shows an exploded view and FIG. 5D shows a cross-section through the same embodiment of the power adaptor 5100.

The exemplary power adapter 5100 includes an inductive receiver 5120, and a heat sink 5130 housed between a lower casing 5160L, and an upper casing 5160U and a power connector 5140 which can be wound around a hand grip 5162 for storage.

The inductive power receiver 5120 consists of a secondary inductive coil 5122 a ferromagnetic disk 5124 and a printed circuit board (PCB) 5126. The heat sink 5130 of the exemplary embodiment consists of a metallic disk sandwiched between the inductive receiver 5120 and the upper casing 5160U. The ferromagnetic disk 5124 may serve as a flux guiding core to improve inductive coupling between the secondary inductive coil 5122 and a primary inductive coil 5220 (FIG. 1) of an inductive power outlet 5200.

When the power adapter 5100 is in operation, heat is generated by a number of components of the inductive receiver 5120. An alternating current is induced in the secondary inductive coil 5122 therefore causing the coil wire to heat up. Furthermore hot spots are typically generated around certain electrical components typically provided on the PCB 5126, such as rectifiers, diodes, MOSFETS, power regulators, LDOs, feedback transmitters or the like.

The heat sink 5130 is typically a thermal conductive material such as aluminum, copper or the like which serves to distribute heat more evenly around the inductive receiver 5120. Preferably, thermal vias are provided through the PCB 5126 and thermal grease or a similar agent is used to improve thermal contact between the heat sink 5130, PCB 5126, ferromagnetic disk 5124 and secondary coil 5122.

Air outlets 5132 are provided in the top 5161 of the upper casing 5160U allowing hot air from inside the power adaptor to escape into the atmosphere. Air inlets 5134 are provided in the bottom 5165 and sides 5167 of the lower casing 5160L and on the sides 5163 of the upper casing 5160U allowing cool air to enter into the power adaptor from below. It is a particular feature of the exemplary embodiment that the outer diameter d of the heat sink is smaller the inner diameter D of the casing 5160 thus allowing air to circulate around the inductive receiver 5120. Thus hot air heated by the inductive power receiver 5120 flows out of the adapter 5100 through the outlets 5132 and cool air from outside is drawn into the adapter 5100 through said air inlets 5134. The hand grip 5162 may be additionally protected from heat by a barrier of thermal insulating material.

It is noted that the air outlets 5132 may allow dust to enter the power adapter 5100. In some embodiments therefore a dust-guard is provided to prevent dust from entering the outlets 5132. In the exemplary embodiment, the grip 5162 overhangs the outlets 5132 serving as a dust-guard to prevent dust from entering the adapter 5100 whilst in operation. When not in operation, the power connector 5140 may be wound around the hand grip 5162, thereby providing further protection against dust.

In certain embodiments, the PCB 5126 includes a light emitting diode (not shown) used as a feedback transmitter for sending signals to an optical detector in the power outlet 5200 (FIG. 5A). It will be appreciated that in such embodiments, it is necessary that a clear line-of-sight is maintained between the optical emitter and detector. To this end, in preferred embodiments an optical window, transparent to the wavelength of the wavelength of the optical transmission, is provided through the secondary inductive coil 5122, ferrite disk 5124, lower casing 5160L and other layers between the PCB 5126 and the primary coil 5220 (FIG. 5A).

Magnetic Flux Guidance

Figure 5E:
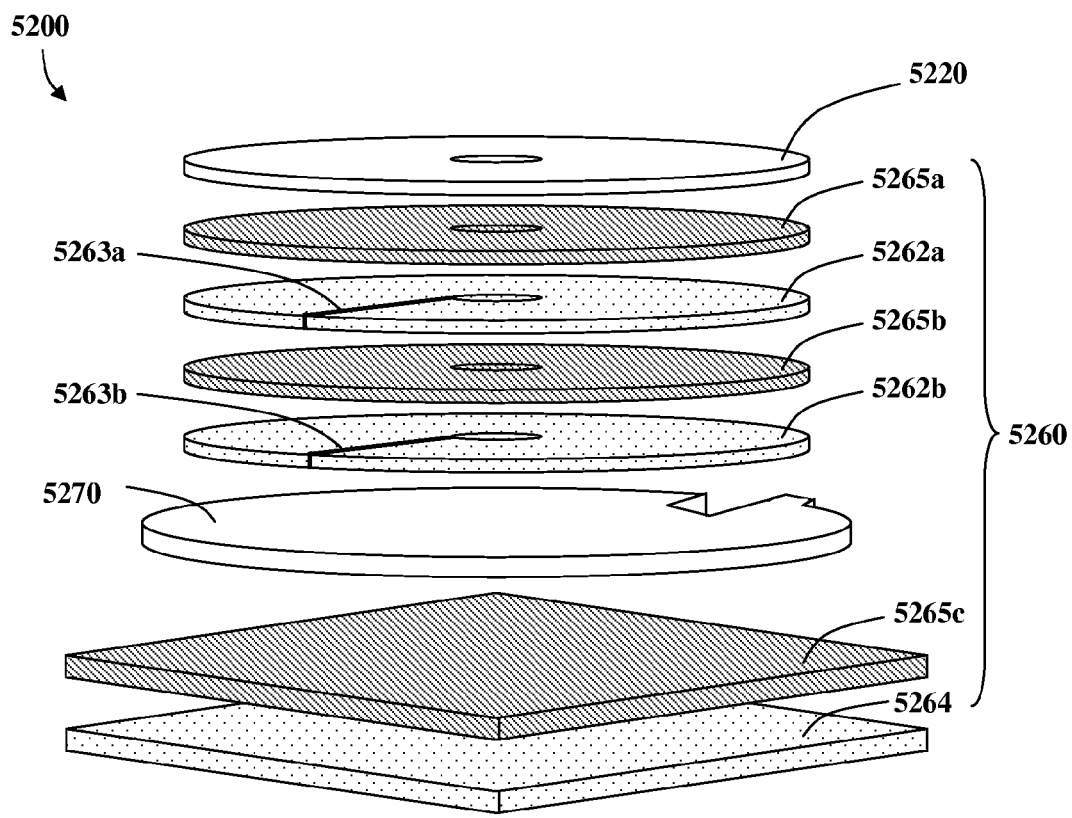
FIG. 5E is an exploded view of an inductive power receiver having a magnetic flux guide according to another embodiment of the invention.
Figure 5F:
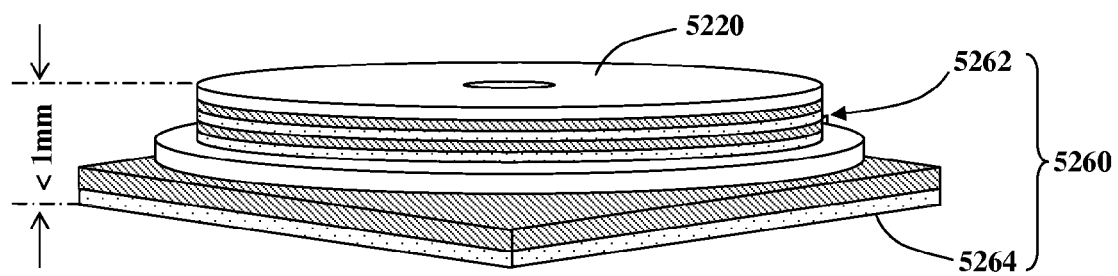
FIG. 5F is an isometric view of the inductive power receiver of FIG. 5E.

Referring now to FIGS. 5E and 5F, an inductive power receiver 5200 is shown including a secondary inductor 5220, a magnetic flux guide 5260 and a PCB 5270, according to a further embodiment of the invention. The secondary inductor 5220 is configured to receive power inductively from a primary inductor of an inductive power outlet (not shown). The magnetic flux guide 5260 is provided to direct magnetic flux from the primary inductor to the secondary inductor 5220 and to reduce flux leakage to the surroundings. The magnetic flux guide 5260 consists of a ferromagnetic core 5262 and a magnetic shield 5264. The ferromagnetic core 5262 is provided to guide magnetic flux from an active primary inductor to the secondary inductor 5220.

In preferred embodiments, the ferromagnetic core 5262 is constructed from amorphous ferromagnetic material, typically cut into wafers from a sheet approximately 20 microns thick or so. In one exemplary embodiment, the ferromagnetic core consists of two amorphous ferromagnetic wafers 5262a, 5262b. A first wafer 5262a is adhered to the primary inductor 5220 by a first adhesive insulating layer 5265a. A second wafer 5262b is adhered to the first wafer 5262a by a second adhesive insulating layer 5265b. The two wafers 5262a, 5262b serve as a ferromagnetic core guiding magnetic flux from a primary inductor to the secondary inductor 5220. It is a particular feature of preferred embodiments that the ferromagnetic wafers 5262a, 5262b each have a radial slit 5265a, 5265b to prevent the buildup of eddy currents within the wafer due to the oscillating magnetic field produced by the primary inductor. Where the wafer has a circular cross section, the slit may extend inwardly diametrically from the circumference.

The magnetic shield 5264 is provided to prevent flux leakage into the surroundings. Preferably, the magnetic shield 5264 is also fabricated from a sheet of thin amorphous ferromagnetic material and may be adhered to the PCB by a third adhesive insulating layer 5265c.

It will be appreciated that a magnetic shield is of particular importance when the inductive receiver 5200 is mounted upon a conductive surface or a device containing conductive components. Thus, for example, when such an inductive power receiver 5200 is mounted upon an electrical device, such as a computer, mobile telephone or the like, the magnetic shield 5264 prevents magnetic flux from leaking into the metallic components of the electrical device and causing them to heat up.

Amorphous ferromagnetic sheets may have a thickness of around 20 microns. When laminated by a polymer laminate on both sides the overall thickness of the sheet is around 60 microns. Thus, in contradistinction to other ferrite elements used to guide magnetic flux in inductive systems, amorphous ferromagnetic materials may be used to fabricate an extremely thin magnetic guide 5260. A thin magnetic guide 5260 in turn allows the inductive power receiver 5200 to be flexible and unobtrusive. It will be appreciated that these considerations are very important in the design and manufacture of device mounted inductive receivers. Various methods of fabricating magnetic guiding elements from amorphous ferromagnetic material include, inter alia: printing, stamping, cutting, amorphous ferromagnetic microwire cloth and the like.

Power Transmission at a Non-Resonant Frequency

The strength of an induced voltage in the secondary inductor of an inductive couple varies according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

Known inductive power transfer systems typically transmit power at the resonant frequency of the inductive coupling. This can be difficult to maintain as the resonant frequency of the system may fluctuate during power transmission, for example in response to changing environmental conditions or variations in alignment between primary and secondary coils.

Inductive transfer systems designed to transmit at resonance therefore require tuning mechanisms for maintaining transmission at the resonant frequency of the system. Tuning may be achieved by adjusting the driving frequency to seek resonance. For example, U.S. Pat. No. 6,825,620, titled "Inductively coupled ballast circuit" to Kuennen et al. describes a resonance seeking ballast circuit for inductively providing power to a load. The ballast circuit includes an oscillator, a driver, a switching circuit, a resonant tank circuit and a current sensing circuit. The current sensing circuit provides a current feedback signal to the oscillator that is representative of the current in the resonant tank circuit. The current feedback signal drives the frequency of the ballast circuit causing the ballast circuit to seek resonance. The ballast circuit preferably includes a current limit circuit that is inductively coupled to the resonant tank circuit. The current limit circuit disables the ballast circuit when the current in the ballast circuit exceeds a predetermined threshold or falls outside a predetermined range.

Alternatively, tuning may be achieved by adjusting the characteristics of the inductive system. For example, U.S. Pat. No. 7,212,414, titled "Adaptive inductive power supply" to Baarman describes a contactless power supply which has a dynamically configurable tank circuit powered by an inverter. The contactless power supply is inductively coupled to one or more loads. The inverter is connected to a DC power source. When loads are added or removed from the system, the contactless power supply is capable of modifying the resonant frequency of the tank circuit, the inverter frequency, the inverter duty cycle or the rail voltage of the DC power source.

Tuning mechanisms such as those described above are necessary in order to maintain transmission at resonance because resonant transmission is highly sensitive. At resonance small variations to the system result in large changes to the power transferred. A further problem associated with resonant transmission is the high transmission voltages involved. At high operating voltages, the capacitors and transistors in the circuit need to be relatively large.

Figure 6A:
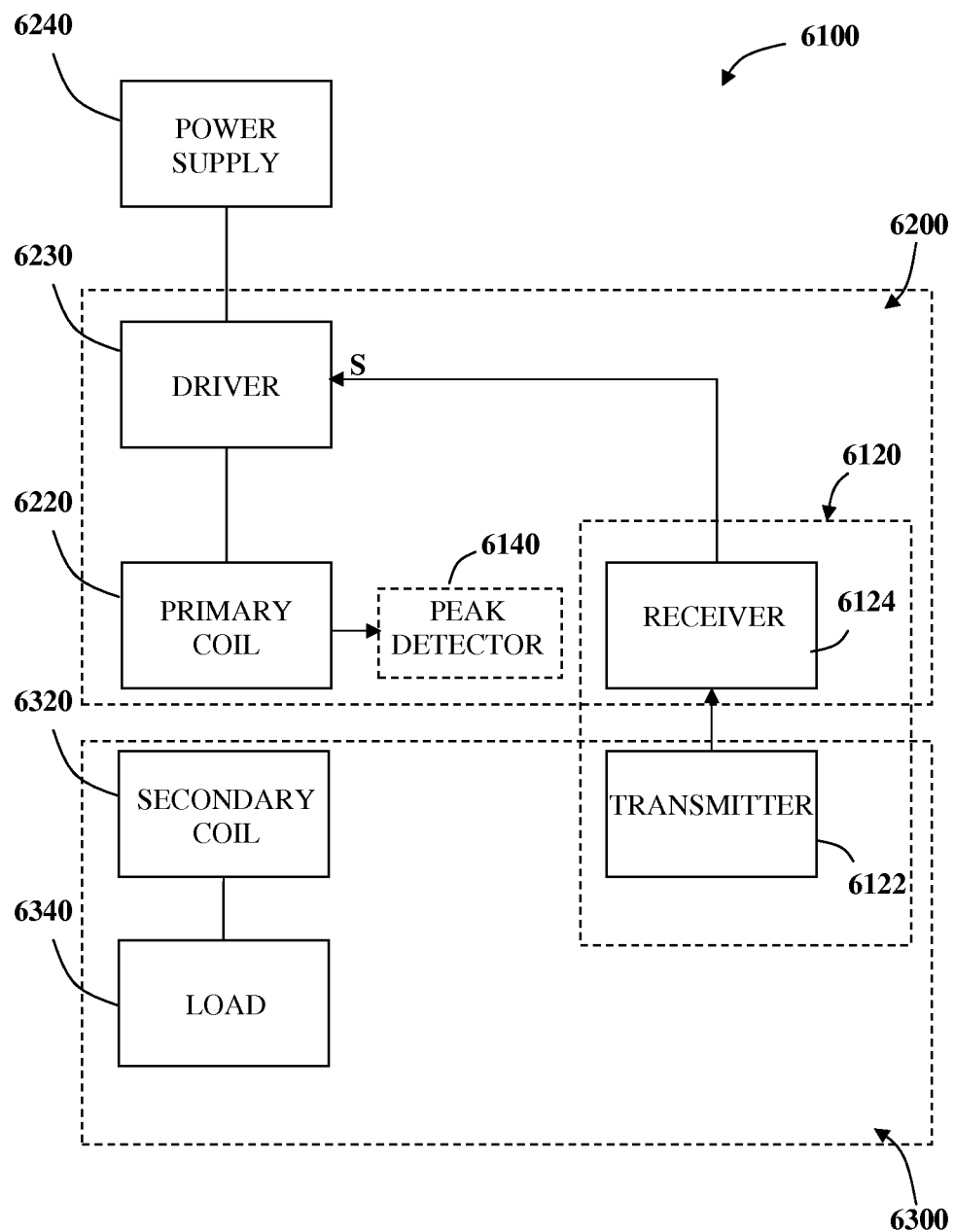
FIG. 6A is a block diagram showing the main elements of an inductive power transfer system with a feedback signal path.

Reference is now made to FIG. 6A showing a block diagram of the main elements of an inductive power transfer system 6100 adapted to transmit power at a non-resonant frequency. The inductive power transfer system 6100 consists of an inductive power outlet 6200 configured to provide power to a remote secondary unit 6300 according to another embodiment of the invention. The inductive power outlet 6200 includes a primary inductive coil 6220 wired to a power source 6240 via a driver 6230. The driver 6230 is configured to provide an oscillating driving voltage to the primary inductive coil 6220.

The secondary unit 6300 includes a secondary inductive coil 6320, wired to an electric load 6340, which is inductively coupled to the primary inductive coil 6220. The electric load 6340 draws power from the power source 6240. A communication channel 6120 may be provided between a transmitter 6122 associated with the secondary unit 6300 and a receiver 6124 associated with the inductive power outlet 6200. The communication channel 6120 may provide feedback signals S and the like to the driver 6230.

In some embodiments, a voltage peak detector 6140 is provided to detect large increases in the transmission voltage. As will be descried below the peak detector 6140 may be used to detect the removal of the secondary unit 6200, the introduction of power drains, short circuits or the like.

Figure 6B:
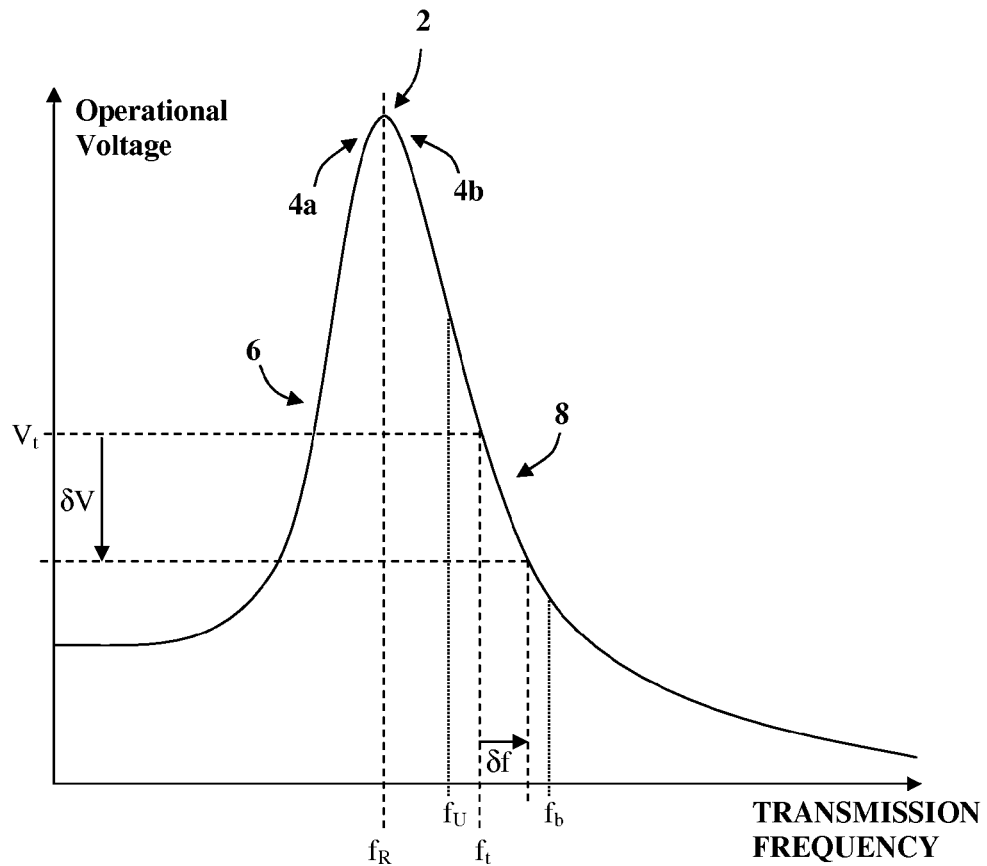
FIG. 6B is a graph showing how the amplitude of operational voltage varies according to frequency.

FIG. 6B is a graph showing how the amplitude of the operational voltage varies according to the transmission frequency. It is noted that the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason prior art inductive transfer systems are typically very sensitive to small fluctuations in environmental conditions or variations in alignment between the induction coils.

It is a particular feature of embodiments of the current invention that the driver 6230 (FIG. 6A) is configured and operable to transmit a driving voltage which oscillates at a transmission frequency which is substantially different from the resonant frequency of the inductive couple. Preferably the transmission frequency is selected to lie within one of the near-linear regions 6, 8 where the slope of the frequency-amplitude graph is less steep.

Figure 6C:
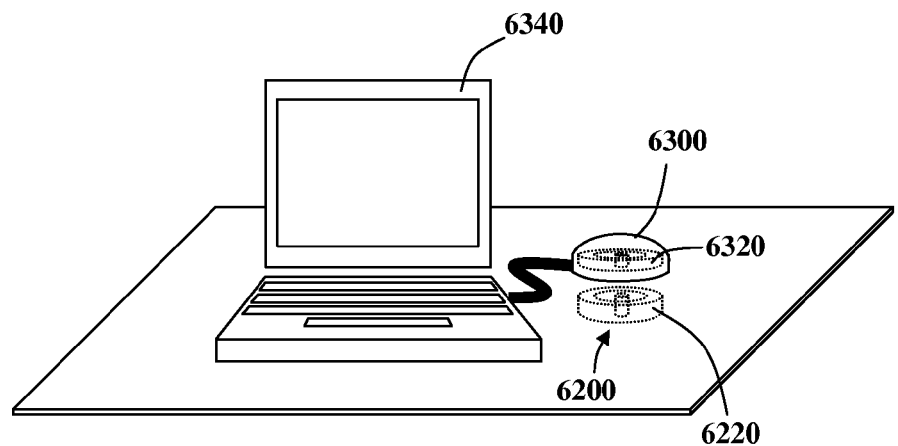
FIG. 6C is a schematic diagram representing a laptop computer drawing power from an inductive power outlet.

One advantage of this embodiment of the present invention may be demonstrated with reference now to FIG. 6C. A schematic diagram is shown representing a laptop computer 6340 drawing power from an inductive power outlet 6200 via a secondary power receiving unit 6300. The power receiving unit 6300 includes a secondary inductive coil 6320 which is aligned to a primary inductive coil 6220 in the inductive power outlet 6200. Any lateral displacement of the secondary power receiving unit 6300 changes the alignment between the secondary inductive coil 6320 to the primary inductive coil 6220. As a result of the changing alignment, the combined inductance of the coil pair changes which in turn changes the resonant frequency of the system.

If the inductive power outlet 6200 transmits power at the resonant frequency of the system, even a small lateral movement would reduce significantly the amplitude of the induced voltage. In contradistinction, according to embodiments of the present invention, the inductive power outlet 6200 transmits power at a frequency in one of the regions 6, 8 to either side of the resonance peak 2 (FIG. 6B) where the slope of the resonance graph is much shallower. Consequently, the system has a much larger tolerance of variations such as lateral movement.

Another advantage of non-resonant transmission is that the transmission frequency may be used to regulate power transfer. In known inductive power transfer systems, power is typically regulated by altering the duty cycle of the transmission voltage provided by the driver. Thus, it will be appreciated that when the transmission frequency is not equal to the resonance frequency of the system, the driver 6230 may be configured to adjust the transmission frequency in order to regulate the power transfer.

Referring back to FIG. 6B, the frequency of transmission is selected to be in the approximately linear region 8 of the curve between a lower frequency value of $f_L$ and an upper frequency value of $f_U$. A transmission frequency $f_t$, higher than the resonant frequency $f_R$ of the system, produces an induced voltage of $V_t$. The induced voltage can be increased by reducing the transmission frequency and can be reduced by increasing the transmission frequency. For example, an increase in transmission frequency of $\delta f$ produces a decrease in induced voltage of $\delta V$.

In some embodiments, a communication channel 6120 (FIG. 6A) is provided between the secondary unit 6300 and the inductive power outlet 6200. Such a communication channel 6120, may be used to communicate required operating parameters which, for example, may indicate the transmission frequency required by the electric load 6340 to the driver 6230.

Various transmitters 6122 and receivers 6124 may be used with the communication channel 6120. Where, as is often the case for inductive systems, the primary and secondary coils 6220, 6320 are galvanically isolated for example, optocouplers may have a light emitting diode serving as a transmitter which sends encoded optical signals over short distances to a phototransistor which serves as a receiver. Optocouplers typically need to be aligned such that there is a line-of-sight between transmitter and receiver. In systems where alignment between the transmitter and receiver may be difficult to achieve, optocoupling may be inappropriate and alternative systems may be preferred such as ultrasonic signals transmitted by piezoelectric elements or radio signals such as Bluetooth, WiFi and the like. Alternatively the primary and secondary coils 6220, 6320 may themselves serve as the transmitter 6122 and receiver 6124.

In certain embodiments, an optical transmitter, such as a light emitting diode (LED) for example, is incorporated within the secondary unit 6300 and is configured and operable to transmit electromagnetic radiation of a type and intensity capable of penetrating the casings of both the secondary unit 6300, and the power outlet 6200. An optical receiver, such as a photodiode, a phototransistor, a light dependent resistors of the like, is incorporated within the power outlet 6200 for receiving the electromagnetic radiation.

The communication channel 6120 may further provide a feedback signal during power transmission. The feedback transmission may communicate required or monitored operating parameters of the electric load 6240 such as: required operating voltage, current, temperature or power for the electric load 6240; the measured voltage, current, temperature or power supplied to the electric load 6240 during operation; the measured voltage, current, temperature or power received by the electric load 6240 during operation and the like.

In some embodiments, a microcontroller in the driver 6230 may use such feedback parameters to calculate the required transmission frequency and to adjust the driver accordingly. Alternatively, simple feedback signals may be provided indicating whether more or less power is required.

Figure 6D:
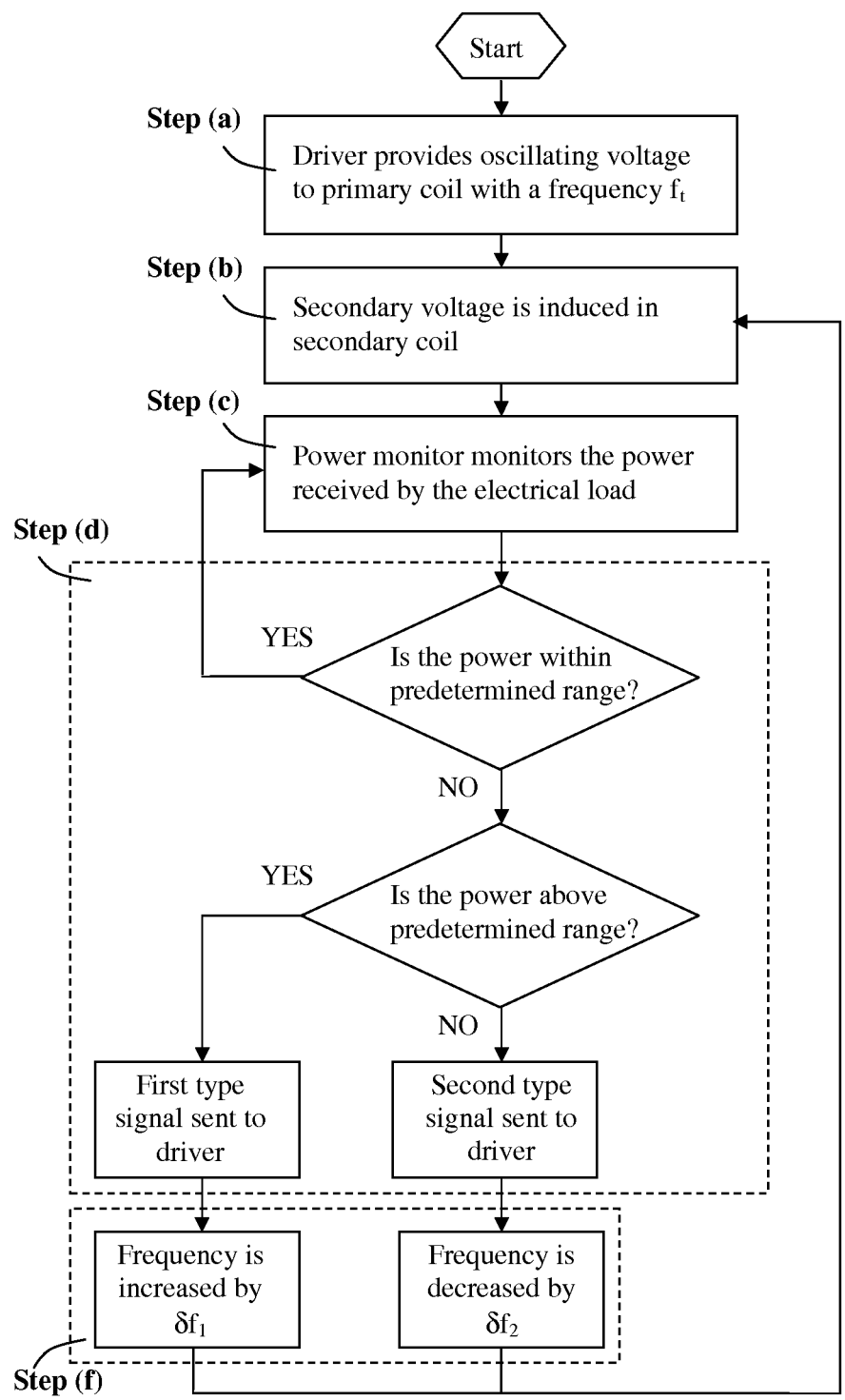
FIG. 6D is a flowchart showing a method for regulating power transfer by varying the power transmission frequency in an inductive power transfer system.

One example of a power regulation method using simple feedback signals is shown in the flowchart of FIG. 6D. The method involves the following steps: (a) The driver 6230 provides an oscillating voltage at a transmission frequency $f_t$ which is higher than the resonant frequency $f_R$ of the system; (b) A secondary voltage is induced in the secondary coil 6320; (c) A power monitor in the secondary unit 6300, monitors the power received by the electric load 6340; (d) If the power received by the electric load 6340 lies within a predetermined range then no action is taken. If the power received by the electric load E340 is below the predetermined range, then a feedback signal of a first type $S_a$ is sent to the driver. If the power received by the electric load 6340 is above the predetermined range, then a feedback signal of a second type $S_b$ is sent to the driver; (e) A feedback signal is received by the driver 6230; (f) If the received feedback signal is of the first type $S_a$, then the transmission frequency is increased by an incremental value $+\delta f_1$. If the received feedback signal is of the second type $S_b$, then the transmission frequency is decreased by an incremental value $-\delta f_2$.

It is noted that by using the power regulation method described above, when the power received by the load is too high, a series of feedback signals of the first type $S_a$ will be transmitted until the power is reduced into the acceptable range. Likewise when the power received by the load is too low, a series of feedback signals of the second type $S_b$ will be transmitted until the power is increased into the acceptable range. It is noted that the positive incremental value $\delta f_1$ may be greater than, less than or equal to the negative incremental value $\delta f_2$.

Alternatively, other power regulation methods using frequency adjustment may be used. For example, in alternative embodiments, the operating parameters of the electric load may be monitored and their values may be transmitted to the power outlet via the communications channel 6120. A processor in the power outlet may then calculate the required transmission frequency directly.

The method described hereabove, refers to a non-resonant transmission frequency lying within the linear region 8 (FIG. 6B), higher than the resonant peak 2. It will be appreciated however that in alternative embodiments frequency controlled power regulation may be achieved when the transmission frequency lies in the lower linear region 6 of the resonance curve. Nevertheless, as explained below, for certain embodiments, the selection of transmission frequencies in the higher linear 8 may be preferred.

As described above, the resonant frequency $f_R$ of an inductive couple is given by the formula $$f_R = \frac{1}{2\pi\sqrt{LC}},$$

where L is the inductance of the system and C is the capacitance of the system. Thus any decrease in either the inductance L or the capacitance C of the system thereby increases its resonant frequency.

In inductive power outlets transmitting at frequencies above the normal resonant frequency of the system, an increase in resonant frequency of the system causes a large increase in the transmission voltage. In preferred embodiments, a peak detector 6140 (FIG. 1) is be provided to monitor the transmission voltage of the power outlet 6200 and is configured to detect large increases in the transmission voltage indicating an increase in resonant frequency. Such increases in transmission voltage may be indicative of power drains, short circuits, removal of the secondary unit or the like.

As an example of the use of a peak detector reference is again made to FIG. 6C. It will be appreciated that in a desktop environment, conductive bodies such as a paper clip, metal rule, the metal casing a stapler, a hole-punch or any metallic objects may be introduced between the inductive power outlet 6200 and the secondary power receiving unit 6300. The oscillating magnetic field produced by the primary coil 6220 would then produce eddy currents in the conductive body heating it and thereby draining power from the primary coil 6220. Such a power drain may be wasteful and/or dangerous.

Power drains such as described above reduce the inductance L of the system. The inductance L may also be reduced by the removal of the secondary coil 6220, a short circuit or the like. A peak detector 6140, wired to the inductive power outlet, would detect any of these scenarios as a large increase in transmission voltage. Preferably, the power transfer system may be further configured to shut down, issue a warning or otherwise protect the user and the system in the event that the peak detector 6140 detects such an increase in transmission voltage.

Figure 6E:
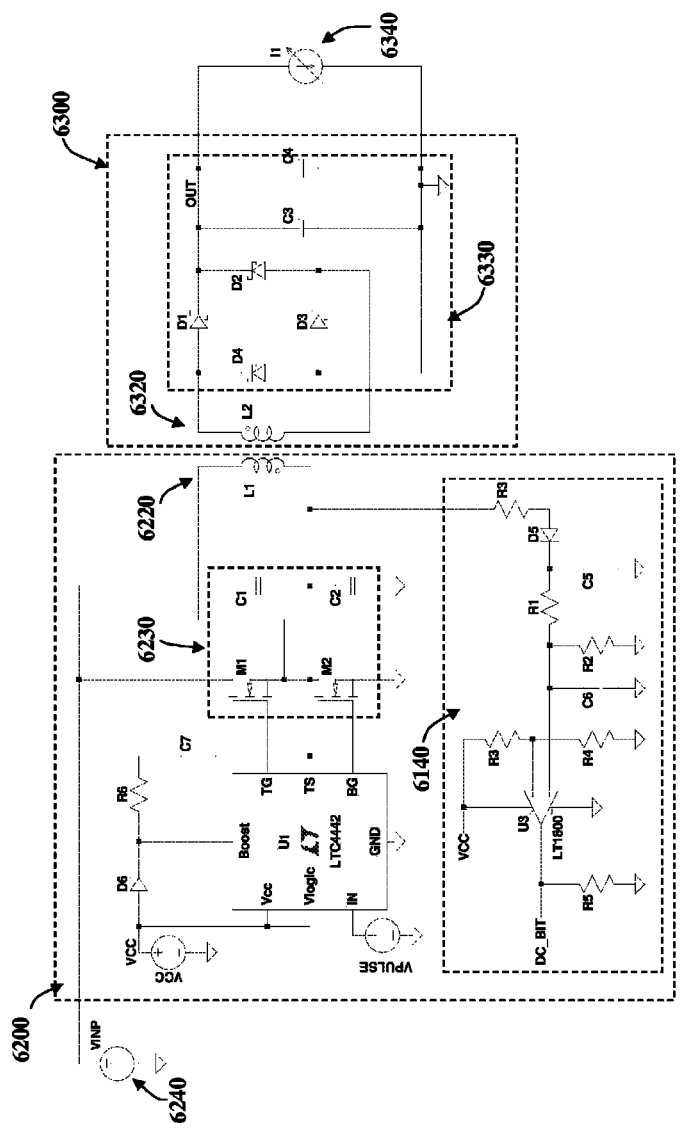
FIG. 6E is a circuit diagram of an inductive power transfer system including a peak detector for detecting large increases in transmission voltage.

FIG. 6E is a circuit diagram of an inductive power outlet 6200 and a secondary unit 6300. The secondary unit 6300 comprises a secondary coil 6320 wired to an electric load 6340 via a rectifier 6330.

The inductive power outlet 6200 comprises a primary coil 6220 driven by a half-bridge converter 6230 connected to a power source 6240. The half-bridge converter 6230 is configured to drive the primary coil 6220 at a frequency higher than the resonant frequency of the system and a peak detector 6140 is configured to detect increases in the transmission voltage.

Although only a half-bridge converter is represented in FIG. E6, it is noted that other possible driving circuits include: a DC-to-DC converter, an AC-to-DC converter, an AC-to-AC converter, a flyback transformer, a full-bridge converter, a flyback converter or a forward converter for example.

Thus, by using a transmission voltage oscillating at a frequency different from the resonant frequency of the system, the inductive transfer system has a higher tolerance to environmental fluctuations and variations in inductive coil alignment than other transfer systems and the frequency may be used to regulate power transfer. Moreover, when the transmission frequency is higher than the resonant frequency of the system, a peak detector may be used to indicate hazards.

Inductive Communication Channel

U.S. Pat. No. 5,455,466 titled, "Inductive coupling system for power and data transfer" to Terry J. Parks and David S. Register describes a system for inductively coupling power and data to a portable electronic device. The portable device, such as a personal digital assistant (PDA), is powered or recharged via an inductive link between the device and a support unit. The same inductive link is also used to transfer data signals between the device and a second electronic device, such as a conventional desktop computer. The support unit includes a primary winding of a transformer, a power amplifier and a modulator. The portable device includes a secondary winding connected in parallel with the input of a rectifier, the output of which is connected to a battery charging circuit, and to a modem, which is further connected to the device microprocessor. Placement of the device on the support unit affects the inductive coupling when the primary and secondary windings are in proximity to one another. Parks' system is thus directed to providing a data channel for synchronizing two data storage devices for example a PDA and a computer.

In Parks' system data transfer from the primary winding to the secondary winding may be provided by modulating the power signal. This requires a separate data signal to be transmitted by the secondary winding which is induced in the primary winding. Power transmission must therefore be interrupted in order to transmit data signals from the secondary winding to the primary winding. As a result, Parks' system does not offer any solution to providing a feedback signal for the regulation of uninterrupted inductive power transfer to an electric load.

Figure 7A:
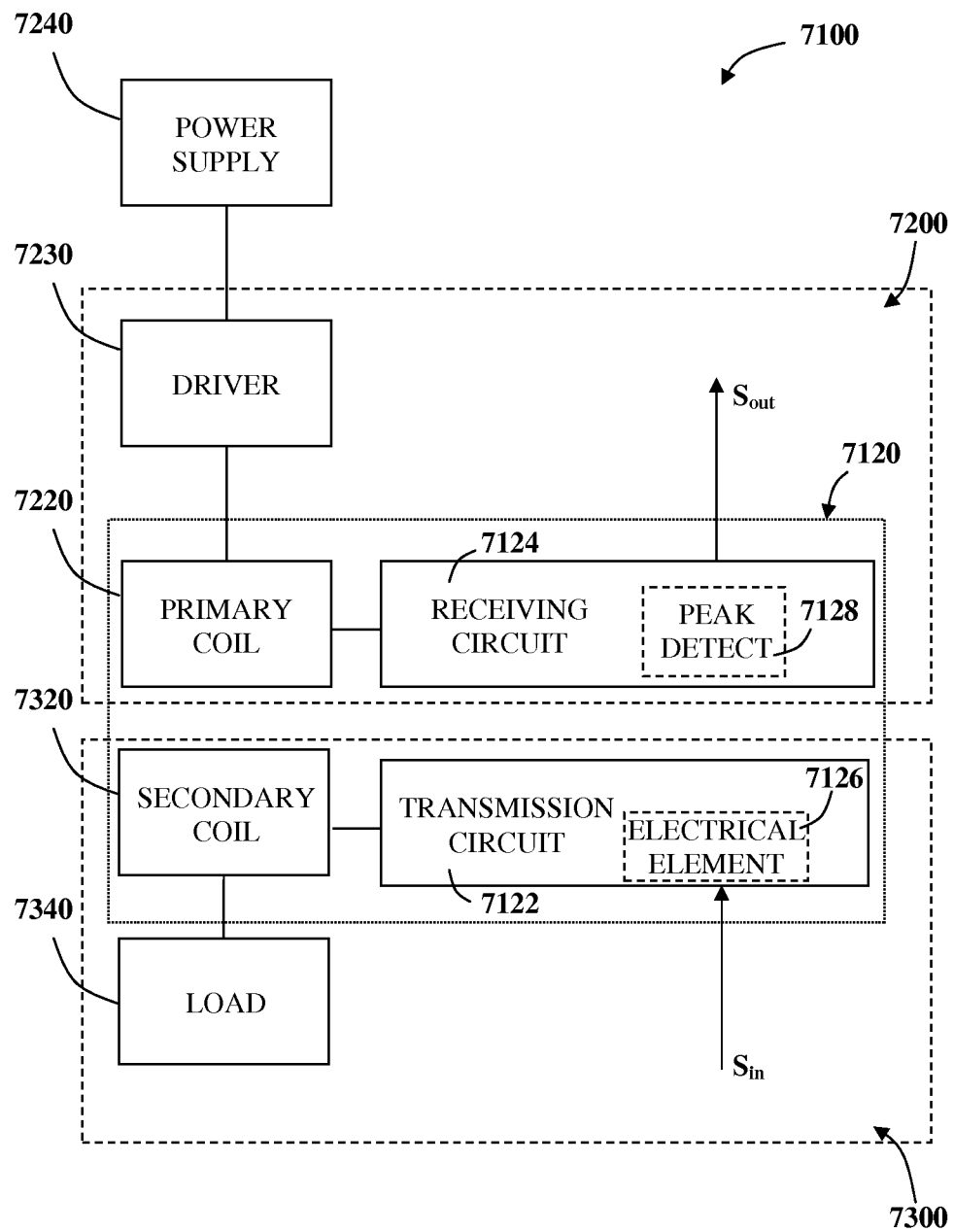
FIG. 7A is a block diagram showing the main elements of an inductive power transfer system with an inductive feedback channel according to another embodiment of the present invention.

Reference is now made to FIG. 7A showing a block diagram of the main elements of an inductive power transfer system 7100 consisting of an inductive power outlet 7200 configured to provide power to a remote secondary unit 7300. The inductive power transfer system 7100 includes an inductive communication channel 7120 according to a further embodiment of the present invention. The communication channel 7120 is configured to produce an output signal $S_{out}$ in the power outlet 7200 when an input signal $S_{in}$ is provided by the secondary unit 7300 without interrupting the inductive power transfer from the outlet 7200 to the secondary unit 7300.

The inductive power outlet 7200 includes a primary inductive coil 7220 wired to a power source 7240 via a driver 7230. The driver 7230 is configured to provide an oscillating driving voltage to the primary inductive coil 7220, typically at a voltage transmission frequency $f_t$ which is higher than the resonant frequency $f_R$ of the system.

The secondary unit 7300 includes a secondary inductive coil 7320, wired to an electric load 7340, which is inductively coupled to the primary inductive coil 7220. The electric load 7340 draws power from the power source 7240. Where the electric load 7340 requires a direct current supply, for example a charging device for an electrochemical cell or the like, a rectifier 7330 may be provided to rectify the alternating current signal induced in the secondary coil 7320.

An inductive communication channel 7120 is provided for transferring signals from the secondary inductive coil 7320 to the primary inductive coil 7220 concurrently with uninterrupted inductive power transfer from the primary inductive coil 7220 to the secondary inductive coil 7320. The communication channel 7120 may provide feedback signals to the driver 7230.

The inductive communication channel 7120 includes a transmission circuit 7122 and a receiving circuit 7124. The transmission circuit 7122 is wired to the secondary coil 7320, optionally via a rectifier 7330, and the receiving circuit 7124 is wired to the primary coil 7220.

The signal transmission circuit 7122 includes at least one electrical element 7126, selected such that when it is connected to the secondary coil 7320, the resonant frequency $f_R$ of the system increases. The transmission circuit 7122 is configured to selectively connect the electrical element 7126 to the secondary coil 7320.

As known, the resonant frequency $f_R$ of an inductive couple is given by the formula $$f_R = \frac{1}{2\pi\sqrt{LC}},$$

where L is the inductance of the system and C is the capacitance of the system. Thus any decrease in either the inductance L or the capacitance C increases the resonant frequency of the system. The electrical element 7126 may be a low resistance for example, typically the resistance of the electrical element 7126 is under 50 ohms and preferably about 1 ohm.

The signal receiving circuit 7124 may include a voltage peak detector 7128 configured to detect large increases in the transmission voltage. In systems where the voltage transmission frequency $f_t$ is higher than the resonant frequency $f_R$ of the system, such large increases in transmission voltage may be caused by an increase in the resonant frequency $f_R$ thereby indicating that the electrical element 7126 has been connected to the secondary coil 7320. Thus the transmission circuit 7122 may be used to send a signal pulse to the receiving circuit 7124 and a coded signal may be constructed from such pulses.

According to some embodiments, the transmission circuit 7122 may also include a modulator (not shown) for modulating a bit-rate signal with the input signal $S_{in}$. The electrical element 7126 may then be connected to the secondary inductive coil 7320 according to the modulated signal. The receiving circuit 7124 may include a demodulator (not shown) for demodulating the modulated signal. For example the voltage peak detector 7128 may be connected to a correlator for cross-correlating the amplitude of the primary voltage with the bit-rate signal thereby producing the output signal $S_{out}$.

In other embodiments, a plurality of electrical elements 7126 may be provided which may be selectively connected to induce a plurality of voltage peaks of varying sizes in the amplitude of the primary voltage. The size of the voltage peak detected by the peak detector 7128 may be used to transfer multiple signals.

Figure 7B:
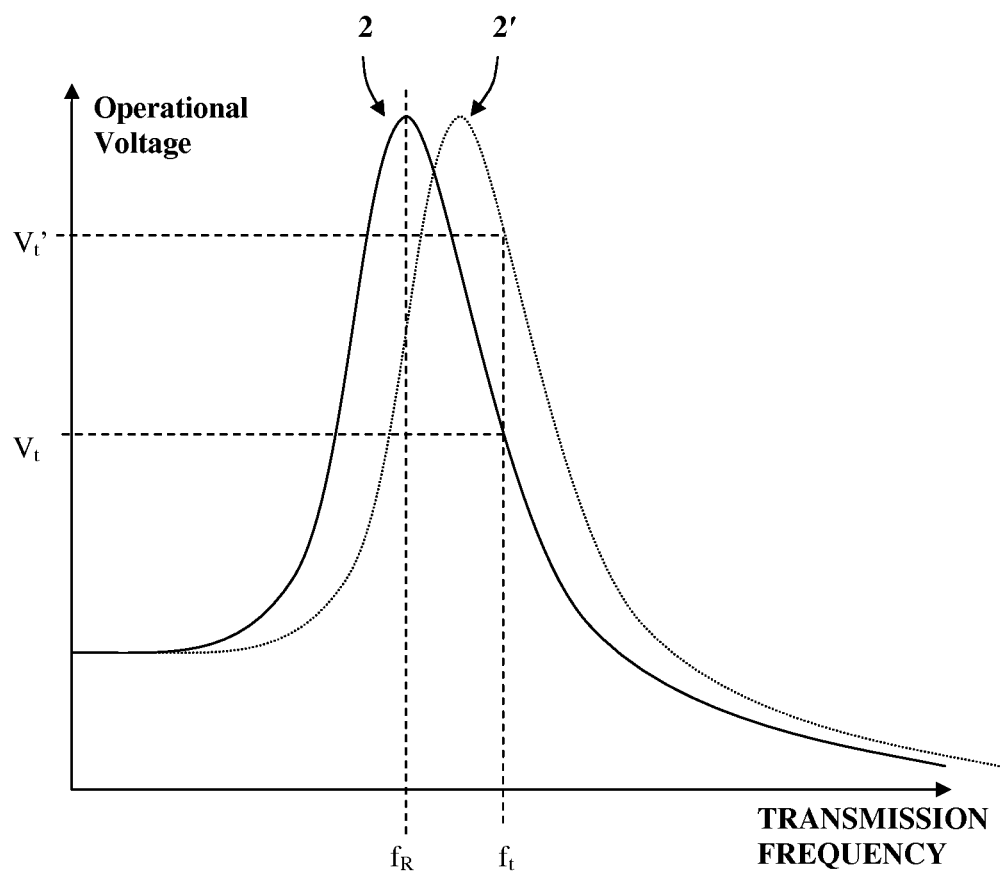
FIG. 7B is a graph showing how the amplitude of operational voltage of an inductive power transfer system varies according to the voltage transmission frequency and the resonant frequency of the system.

FIG. 7B is a graph showing how the amplitude of the operational voltage varies according to the transmission frequency. It is noted that the voltage is at its highest when the transmission frequency is equal to the resonant frequency $f_R$ of the system, this maximum amplitude is known as the resonance peak 2. If the resonant frequency $f_R$ of the system increases, a new resonance peak 2' is produced.

According to an exemplary embodiment of the invention, an inductive power transfer system 7100 operates at a given transmission frequency $f_t$ which is higher than the resonant frequency $f_R$ of the system. The normal operating voltage $V_t$ is monitored by the voltage peak detector 7128. When the electric element 7126 is connected to the secondary inductive coil 7320 the resonant frequency of the system increases. Therefore, the operating voltage increases to a higher value $V_t'$. This increase is detected by the voltage peak detector 7128.

The present invention allows data signals to be transferred from the secondary coil 7320 to the primary coil 7220 concurrently with inductive transfer of power from the primary coil 7220 to the secondary coil 7320. Consequently, the signal transfer system may be used to provide feedback signals for real time power regulation. This is in contradistinction to prior art inductive signal transfer systems, such as the system described in U.S. Pat. No. 5,455,466 titled, "Inductive coupling system for power and data transfer" to Terry J. Parks and David S. Register, in which a separate data signal is supplied to the secondary inductive coil such that a voltage is induced in the primary coil.

Figure 7C:
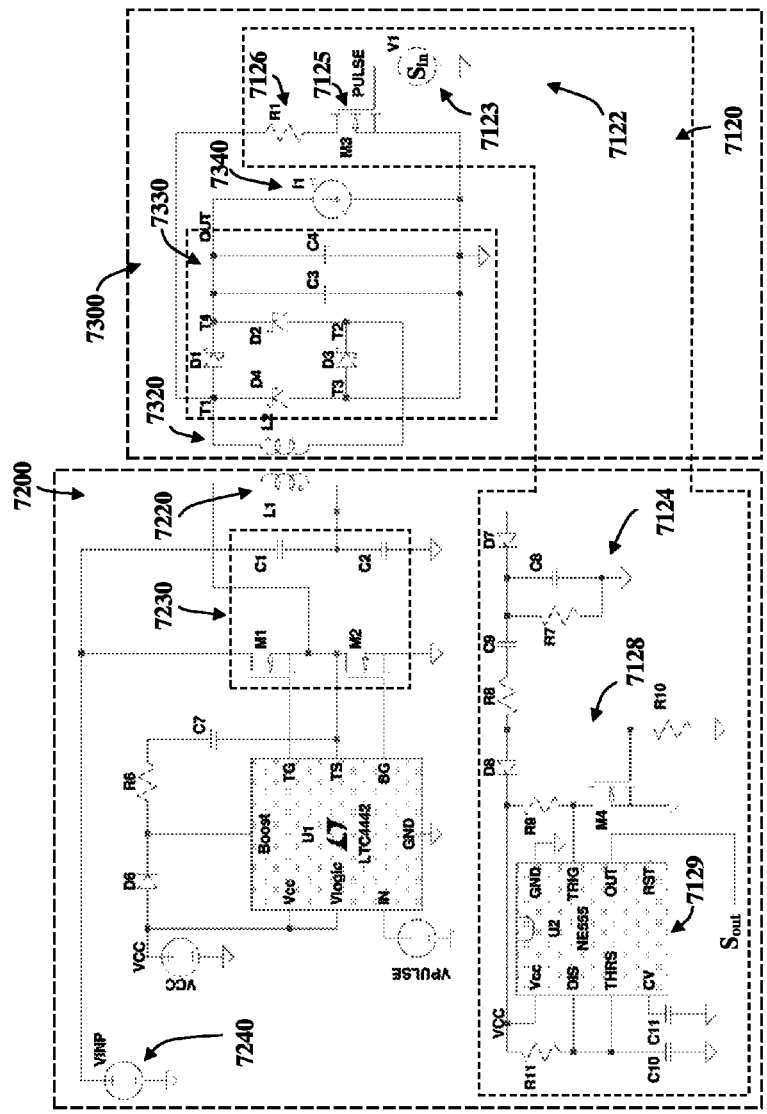
FIG. 7C is a circuit diagram of an inductive power transfer system including an inductive feedback channel for providing coil-to-coil signal transfer concurrently with uninterrupted inductive power transfer between the coils in accordance with another embodiment of the invention.

FIG. 7C shows an exemplary circuit diagram of an inductive power outlet 7200 and a secondary unit 7300, according to another embodiment of the invention. An inductive feedback channel 7120 is provided for transferring signals between the coils concurrently with uninterrupted inductive power transfer.

The inductive power outlet 7200 comprises a primary coil 7220 driven by a half-bridge converter 7230 connected to a power source 7240. The half-bridge converter 7230 is configured to drive the primary coil 7220 at a frequency higher than the resonant frequency of the system. The secondary unit 7300 comprises a secondary coil 7320 wired to the input terminals $T_1$, $T_2$ of a rectifier 7330, and an electric load 7340 wired to the output terminals $T_3$, $T_4$ of the rectifier 7330.

Although only a half-bridge converter 7230 is represented in the inductive power outlet 7200 of FIG. 7C, it is noted that other driving circuits could be used. These include: a DC-to-DC converter, an AC-to-DC converter, an AC-to-AC converter, a flyback transformer, a full-bridge converter, a flyback converter or a forward converter for example.

The inductive feedback channel 7120 comprises a transmission circuit 7122, in the secondary unit 7300 and a receiving circuit 7124 in the inductive power outlet 7200. The transmission circuit 7122 comprises an electrical resistor 7126 connected to the rectifier 7330 via a power MOSFET switch 7125. A modulator 7123 may provide an input signal $S_{in}$ to the power MOSFET 7125.

It is noted that in this embodiment the transmission circuit 7122 is wired to one input terminal $T_1$ and one output terminal $T_3$ of the rectifier 7330. This configuration is particularly advantageous as, even when the transmission circuit 7122 is connected, the resistor 7126 only draws power from the system during one half of the AC cycle, thereby significantly reducing power loss.

The receiving circuit 7124 includes a voltage peak detector 7128 that is configured to detect increases in the transmission voltage, and a demodulator 7129 for producing an output signal $S_{out}$.

Figure 7D:
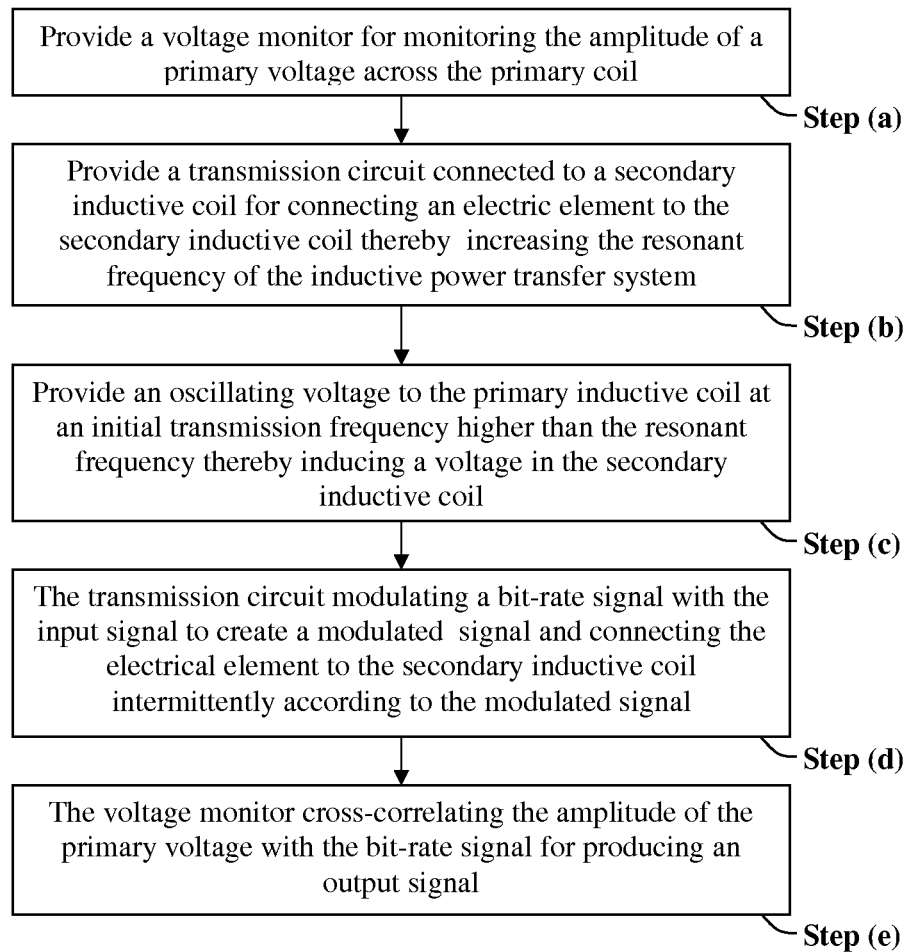
FIG. 7D is a flowchart showing a method for transferring a signal from the secondary inductive coil to a primary inductive coil of an inductive power transfer system according to still a further embodiment of the invention.

With reference now to FIG. 7D, a flowchart is presented showing the main steps in a method for transferring a signal from the secondary inductive coil to a primary inductive coil of an inductive power transfer system. The method includes the following steps:

Step (a)—connecting the primary inductive coil to a voltage monitor for monitoring the amplitude of a primary voltage across the primary coil;

Step (b)—connecting the secondary inductive coil to a transmission circuit for connecting an electric element to the secondary inductive coil thereby increasing the resonant frequency of the inductive power transfer system;

Step (c)—providing an oscillating voltage to the primary inductive coil at an initial transmission frequency higher than the resonant frequency thereby inducing a voltage in the secondary inductive coil;

Step (d)—using the transmission circuit to modulate a bit-rate signal with the input signal to create a modulated signal and connecting the electrical element to the secondary inductive coil intermittently according to the modulated signal;

Step (e)—using the voltage monitor to cross-correlate the amplitude of the primary voltage with the bit-rate signal for producing an output signal.

The inductive feedback channel 7120 may be used for transferring data, such as data pertaining to any or all of the following: the required operating voltage, current, temperature or power for the electric load 7240; the measured voltage, current, temperature or power supplied to the electric load 7240 during operation; the measured voltage, current, temperature or power received by the electric load 7240 during operation and the like; identification data for the user, electronic device and such like; a release signal of a transmission-key for releasing a transmission-lock.

Therefore, the inductive communication channel may be used to transfer a feedback signal from the secondary inductive coil to the primary inductive coil for regulating power transfer across an inductive power coupling.

For example the system may be configured to transfer two signals with the driver being configured to decrease the transmission power when a first signal is received, and to increase the transmission power when a second signal is received.

Power may be regulated by altering the duty cycle of the transmission voltage provided by the driver. Furthermore, the driver 7230 may be configured to adjust the transmission frequency in order to regulate the power transfer, as described hereinabove. Accordingly, the driver may be configured to adjust the transmission frequency in response to feedback signals. The transmission frequency may be increased when the first signal is received thereby decreasing the operating voltage, and the transmission frequency may be decreased when the second signal is received, thereby increasing the operating voltage.

Thus a communication channel is provided for regulating power transfer and/or for transmitting data signals from the secondary coil to the primary coil of an inductive couple while power is being transferred.

It will be apparent from the above description that various embodiment of the present invention disclose significant advantages enabling the efficient, safe and unobtrusive inductive transfer of power. It is further noted that, in combination, these advantages allow an inductive power transmission system to become a practical tool suitable for a variety of applications.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for regulating inductive power transmission from an inductive power outlet to an inductive power receiver, the inductive power outlet including a primary inductive coil wired to a power supply via a driver, and the inductive power receiver including a secondary inductive coil wired to an electric load, the method comprising:
   providing a driving voltage to the primary inductive coil thereby;
   inducing a secondary voltage in the secondary inductive coil;
   the driver receiving simple feedback control signals from the inductive power receiver; and
   the driver responding to the simple feedback control signals by:
   increasing power by a predefined incremental value when the received feedback control signal is of a first type, and
   reducing power by a predefined incremental value when the received feedback control signal is of a second type.

2. The method of claim 1 further comprising:
   the inductive power receiver monitoring power received by the electric load;
   the inductive power receiver sending a feedback control signal of a first type to the driver, whenever the power drops below a first threshold, and
   the inductive power receiver sending a feedback control signal of a second type to the driver, whenever the power exceeds a second threshold.

3. The method of claim 1 wherein the driving voltage has an initial transmission frequency $f_t$ higher than the resonant frequency $f_R$.

4. The method of claim 3 wherein the driver adjusts the driving voltage by:
   the driver reducing the transmission frequency by a predetermined incremental value when the received feedback control signal is of the first type, and
   the driver increasing the transmission frequency by a predetermined incremental value when the received feedback control signal is of the second type.

5. The method of claim 1 wherein the driver adjusts driving voltage by altering the duty cycle of the driving voltage.

6. The method of claim 1 wherein the driver adjusts driving voltage by altering the amplitude of the driving voltage.

7. The method of claim 1 wherein the feedback control signals are transferred concurrently with uninterrupted inductive power transfer.

8. A signal receiving circuit for an inductive power outlet configured to provide power to an electric load via an inductive power receiver, the inductive power outlet including at least one primary inductive coil wired to a power supply via a driver configured to provide a driving voltage across the primary inductive coil such that a secondary voltage is induced in a secondary inductive coil associated with the inductive power receiver;
wherein the signal receiving circuit comprises:
 a voltage monitor for monitoring the amplitude of the driving voltage across the primary coil;
 a controller configured to receive simple feedback control signals of at least a first type and a second type from the inductive power receiver, wherein:
 the first type of feedback control signal is selected by the inductive power receiver when more power is required, and
 the second type of feedback control signal is selected by the inductive power receiver when less power is required,
 and the controller is further configured to adjust the driving voltage according to the feedback control signals.

9. The inductive power outlet of claim 8 wherein the driver comprises a signal detector configured to detect the first type of feedback control signal and the second type of feedback control signal, and the driver is configured to:
 increase power by an incremental value when the first type of feedback control signal is detected by the detector, and
 decrease power by an incremental value when the second type of feedback control signal is detected by the detector.

10. The inductive power outlet of claim 8 wherein the driving voltage oscillates at a frequency higher than the resonant frequency.

11. The inductive power outlet of claim 10 wherein the driver comprises a signal detector configured to detect the first type of feedback control signal and the second type of feedback control signal, and the driver is configured to:
 decrease the transmission frequency when the first type of feedback control signal is detected by the detector, and
 increase the transmission frequency when the second type of feedback signal signal is detected by the detector.

12. The inductive power outlet of claim 8 wherein the driver is further configured to alter the duty cycle of the driving voltage in response to the simple feedback control signals.

13. The inductive power outlet of claim 8 wherein the driver is further configured to alter the amplitude of the driving voltage in response to the simple feedback control signals.

14. The inductive power outlet of claim 8 wherein the driver is further configured to receive feedback control signals concurrently with uninterrupted inductive power transfer.

15. A signal transmission circuit for an inductive power receiver configured to provide energy to an electric load, the inductive power receiver comprising:
 at least one secondary inductive coil for forming an inductive couple with at least one primary inductive coil of an inductive power outlet, the inductive power outlet further comprising at least one driver configured to provide an oscillating driving voltage across the primary inductive coil;
wherein:
the signal transmission circuit comprises:
 at least one power monitor operable to monitor power received by the electric load;
 at least one electrical element selected such that a detectable change occurs when the electrical element is connected to the secondary coil; and
 at least one switch configured to connect to the electrical element to the secondary coil thereby causing a detectable signal pulse in the driving voltage such that simple feedback control signals are detectable by the inductive power outlet; and
the signal transmission circuit is operable to send simple feedback control signals of at least a first type and a second type, wherein:
 the first type of feedback control signal is selected by the inductive power receiver when more power is required, and
 the second type of feedback control signal is selected by the inductive power receiver when less power is required.

16. The signal transmission circuit of claim 15 configured to send
 a feedback control signal of the first type to the driver, whenever the power drops below a first threshold, and
 a feedback control signal of the second type to the driver, whenever the power exceeds a second threshold.

17. The signal transmission circuit of claim 15 further configured to send feedback control signals concurrently with uninterrupted inductive power transfer.

* * * * *